United States Patent
Saito

(10) Patent No.: US 12,294,315 B2
(45) Date of Patent: May 6, 2025

(54) INVERTER DEVICE, AND VEHICULAR ELECTRIC COMPRESSOR PROVIDED WITH SAME

(71) Applicant: SANDEN CORPORATION, Isesaki (JP)

(72) Inventor: Atsushi Saito, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 257 days.

(21) Appl. No.: 18/040,225

(22) PCT Filed: Aug. 24, 2021

(86) PCT No.: PCT/JP2021/030910
§ 371 (c)(1),
(2) Date: Feb. 1, 2023

(87) PCT Pub. No.: WO2022/045098
PCT Pub. Date: Mar. 3, 2022

(65) Prior Publication Data
US 2023/0327577 A1    Oct. 12, 2023

(30) Foreign Application Priority Data
Aug. 25, 2020   (JP) ................................ 2020-141410

(51) Int. Cl.
*H02M 7/5387* (2007.01)
*H02M 1/32* (2007.01)
(Continued)

(52) U.S. Cl.
CPC ....... *H02M 7/53871* (2013.01); *H02M 1/327* (2021.05); *H02M 7/48* (2013.01); *H02M 1/0009* (2021.05)

(58) Field of Classification Search
CPC . H02M 7/53871; H02M 1/327; H02M 1/0009
See application file for complete search history.

(56) References Cited

U.S. PATENT DOCUMENTS

| 5,875,414 A | * | 2/1999 | Tsutsumi | ................ | H02M 1/32 |
| | | | | | 702/130 |
| 9,313,933 B2 | * | 4/2016 | Sugahara | ................ | H01L 23/34 |

(Continued)

FOREIGN PATENT DOCUMENTS

| JP | 2002-119044 A | 4/2002 |
| JP | 2005-269832 A | 9/2005 |

(Continued)

OTHER PUBLICATIONS

International Search Report mailed Oct. 19, 2021 for International Application No. PCT/JP2021/030910.

*Primary Examiner* — Yusef A Ahmed
(74) *Attorney, Agent, or Firm* — Baker Botts L.L.P.

(57) ABSTRACT

It is an object to provide an inverter device capable of appropriately protecting power semiconductor elements and further realizing an optimal operation considering a withstand voltage. The inverter device includes a junction temperature estimate calculating unit which adds a temperature rise value ΔT obtained from a loss P of power semiconductor elements to a temperature Tth detected by a temperature sensor to estimate a junction temperature Tj. When the junction temperature Tj is estimated, the junction temperature estimate calculating unit performs a correction in the direction of excluding an influence of heat generation of other electronic components other than the power semiconductor elements, and a wiring pattern of a control board on a temperature sensor.

17 Claims, 11 Drawing Sheets

(51) Int. Cl.
*H02M 7/48* (2007.01)
*H02M 1/00* (2006.01)

(56) References Cited

U.S. PATENT DOCUMENTS

| | | | | |
|---|---|---|---|---|
| 10,156,482 B2* | 12/2018 | Imakiire | | G01K 7/16 |
| 10,191,021 B2* | 1/2019 | Singh | | G01N 33/00 |
| 11,201,538 B2* | 12/2021 | Sakamoto | | H02M 1/0054 |
| 2005/0204761 A1* | 9/2005 | Karikomi | | G01K 7/425 |
| | | | | 374/E7.043 |
| 2007/0221994 A1* | 9/2007 | Ishikawa | | H01L 27/0248 |
| | | | | 257/356 |
| 2009/0046405 A1* | 2/2009 | Ichikawa | | H03K 17/0822 |
| | | | | 361/103 |
| 2009/0051307 A1* | 2/2009 | Katsuyama | | H03K 17/18 |
| | | | | 318/472 |
| 2012/0075761 A1* | 3/2012 | Miura | | H02M 1/32 |
| | | | | 327/109 |
| 2012/0217795 A1* | 8/2012 | Hasegawa | | H02M 7/48 |
| | | | | 307/9.1 |
| 2013/0119912 A1* | 5/2013 | Ayano | | H02M 1/32 |
| | | | | 318/472 |
| 2013/0147407 A1* | 6/2013 | Kawamura | | H02P 29/68 |
| | | | | 374/102 |
| 2014/0152214 A1* | 6/2014 | Furukawa | | H02M 7/53875 |
| | | | | 318/400.13 |
| 2015/0160074 A1* | 6/2015 | Tanabe | | G01K 7/42 |
| | | | | 374/185 |
| 2015/0188530 A1* | 7/2015 | Shinohara | | H02M 7/53875 |
| | | | | 327/172 |
| 2016/0099665 A1* | 4/2016 | Chen | | H02M 7/53871 |
| | | | | 363/56.02 |
| 2016/0356655 A1* | 12/2016 | Tsurumaru | | G01K 7/42 |
| 2018/0029635 A1* | 2/2018 | Kuroda | | B62D 3/12 |
| 2018/0099574 A1* | 4/2018 | Zhou | | B60L 53/14 |
| 2019/0149145 A1* | 5/2019 | Yang | | H02M 3/155 |
| | | | | 318/139 |
| 2020/0052642 A1* | 2/2020 | Kuroki | | H02P 29/60 |
| 2020/0382003 A1* | 12/2020 | Sakamoto | | H02M 1/0054 |
| 2021/0305931 A1* | 9/2021 | Harada | | H02P 21/22 |
| 2022/0034949 A1* | 2/2022 | Inomata | | G01K 7/427 |
| 2022/0385208 A1* | 12/2022 | Matsuoka | | G01R 31/26 |
| 2022/0385224 A1* | 12/2022 | Sano | | H02K 11/33 |
| 2023/0202261 A1* | 6/2023 | Kawamura | | F04D 25/0673 |
| 2023/0421045 A1* | 12/2023 | Sugihara | | H02M 7/48 |
| 2024/0072645 A1* | 2/2024 | Araki | | H02M 7/5387 |
| 2024/0255356 A1* | 8/2024 | Kuroki | | G01K 1/024 |

FOREIGN PATENT DOCUMENTS

| | | |
|---|---|---|
| JP | 3983439 B2 | 9/2007 |
| JP | 2007-259576 A | 10/2007 |
| JP | 2008-005615 A | 1/2008 |
| JP | 2008-215089 A | 9/2008 |
| JP | 2011-223678 A | 11/2011 |
| JP | 2018-046647 A | 3/2018 |
| JP | 6330219 B2 | 5/2018 |
| KR | 10-2101901 B1 | 4/2020 |

\* cited by examiner

FIG. 8
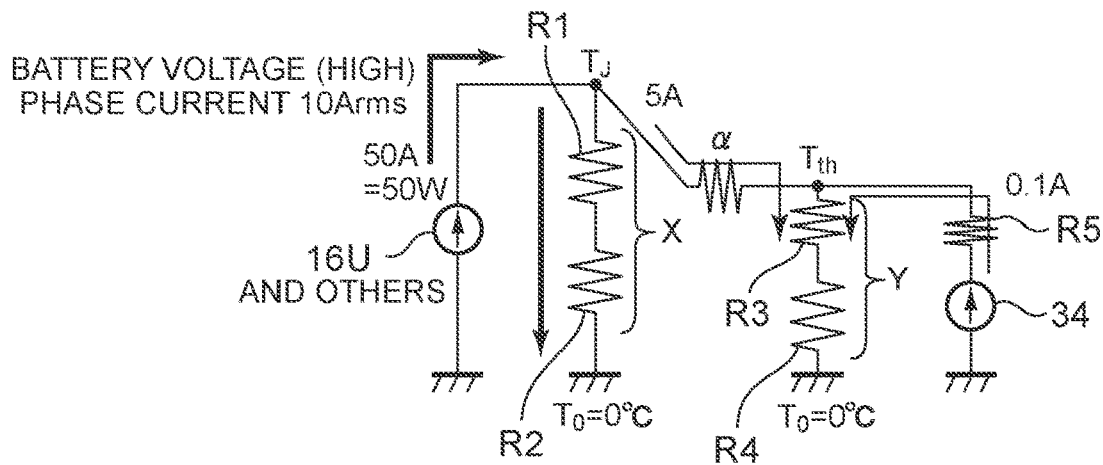
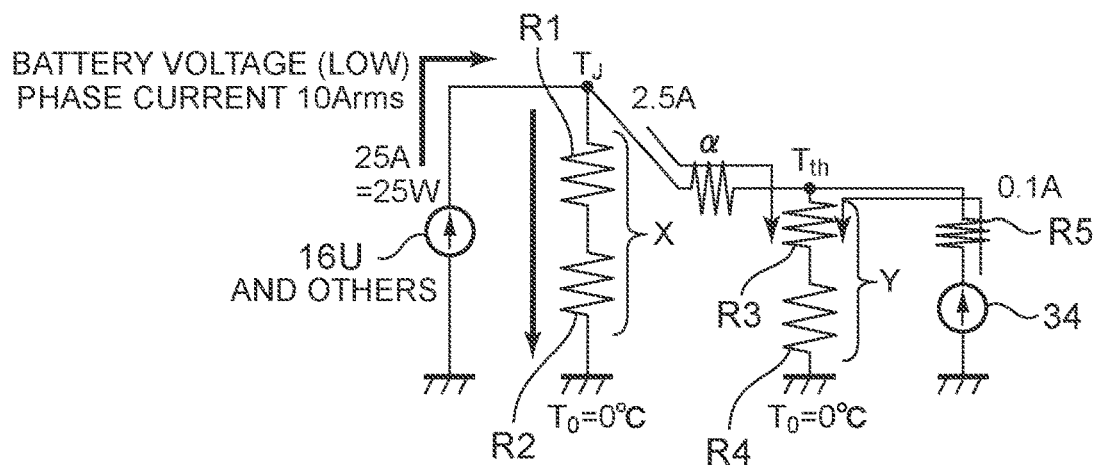
FIG. 9
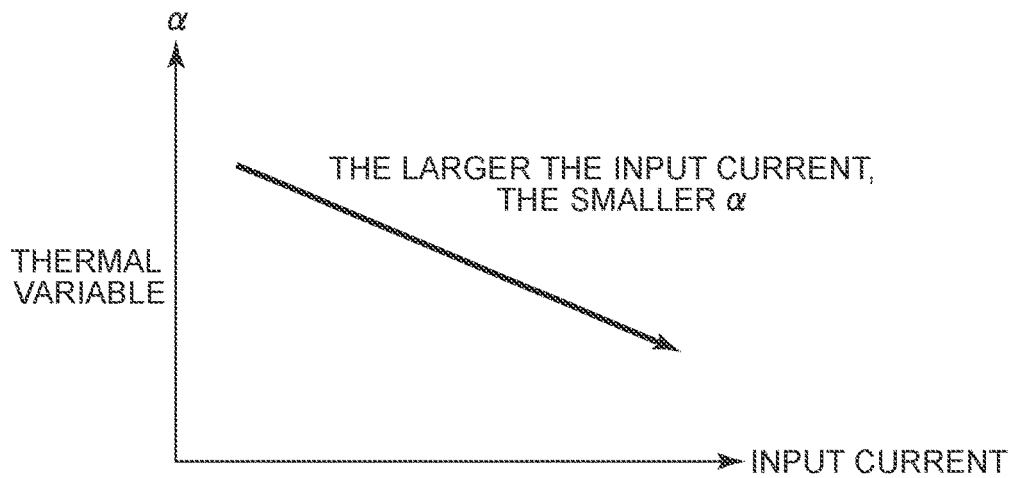

INVERTER DEVICE, AND VEHICULAR ELECTRIC COMPRESSOR PROVIDED WITH SAME

TECHNICAL FIELD

The present invention relates to, for example, an inverter device which operates a motor of an electric compressor, and a vehicular electric compressor provided with the inverter device.

BACKGROUND ART

A hybrid vehicle and an electric vehicle have been attracting attention due to recent environmental problems, but an electric compressor is used as a refrigerant compressor in an air conditioner of this type of hybrid vehicle or the like. This electric compressor drives a compression element by a motor, which is electricity-fed from a vehicle battery (power supply), but this motor is operated by an inverter device.

This type of inverter device controls the energization of each phase of the motor by switching power semiconductor elements (IGBT, MOSFET, etc.) of bridge configuration, but these power semiconductor elements generate heat corresponding to a loss. Therefore, in particular, when the electric compressor is a vehicular electric compressor used under a harsh temperature (high temperature) environment such as an engine room, superheat protection of the power semiconductor elements constituting the inverter device becomes extremely important.

As a protection method considering heat generation of such power semiconductor elements, there is a method of estimating a junction temperature of the power semiconductor element and stopping the operation, based on the rise of the unction temperature to a predetermined value. This junction temperature is the temperature of a chip inside the power semiconductor element (surface temperatures of an IGBT chip or a MOSFET chip, and an FWD chip). This is obtained by detecting the temperature of a control board to which the terminal of the power semiconductor element is connected (the temperature in the vicinity of the power semiconductor element) by a temperature sensor (temperature detector), and adding to this detected value, a temperature rise value corresponding to the amount of heat generated due to a loss consisting of a switching loss and a steady loss (conduction loss or energization loss) of the power semiconductor element (refer to, for example, Patent Document 1 and Patent Document 2).

CITATION LIST

Patent Documents

Patent Document 1: Japanese Patent Application Laid-Open No. 2018-46647
Patent Document 2: Japanese Patent No. 6330219
Patent Document 3: Japanese Patent No. 3983439

SUMMARY OF THE INVENTION

Problems to be Solved by the Invention

However, other electronic components and wiring patterns other than each power semiconductor element exist on the control board on which the temperature detector is placed, and these also generate heat when energized. A problem arises in that since this heat is transferred to the temperature detector, the temperature detector detects a temperature higher than the actual junction temperature, and the operation is suppressed or stopped at the stage where it is not necessary to perform superheat protection of the power semiconductor element.

Further, when the inverter device is used for operating the motor of the vehicular electric compressor, the power semiconductor element is arranged in a heat exchange relationship with a housing of the vehicular electric compressor. This is for cooling the power semiconductor element by a low-temperature suction refrigerant flowing into the housing, but a cooling effect in this case varies depending on the number of revolutions of the motor, so that the conventional method for estimating the junction temperature was accompanied by a problem that an accurate temperature could not be estimated and after all, adequate protection could not be performed.

In addition, it is an actual situation that the withstand voltage of the power semiconductor element has been developed in series at intervals with a relatively large width as in the case of, for example, a 600V withstand voltage product and a 1200V withstand voltage product in the case of IGBTs. In this case, the higher the withstand voltage of the IGBT, the worse the electrical characteristics, and the disadvantageous in terms of cost.

On the other hand, when the gate of the IGBT is driven, a surge voltage $\Delta V$ ($=L*di/dt$) is generated as shown on the left side of FIG. 15 due to the inductance L of a wiring bus bar when the gate is turned from ON to OFF (turn off). However, when this surge voltage $\Delta V$ exceeds the withstand voltage of the IGBT (the upper limit of the allowable collector-emitter voltage), there is a risk that the element will be destroyed. Therefore, for example, in driving a motor of an electric compressor mounted on a vehicle, when the upper limit voltage value of a high voltage battery has no margin for the withstand voltage (element withstand voltage) of the power semiconductor element, it is necessary to make the surge voltage $\Delta V$ shown on the left side of FIG. 15 extremely small. The reason is that as mentioned above, it is desired to avoid the use of the higher withstand voltage product as much as possible.

On the other hand, as shown on the right side of FIG. 15, for example, the withstand voltage of the IGBT has a characteristic that the lower the junction temperature, the lower the withstand voltage. In this case, it has a linearity of how many volts drop for every 1° C. drop in junction temperature. Then, when the withstand voltage is a value of the upper limit voltage value of the high voltage battery+the surge voltage $\Delta V$ when the junction temperature is X° C., there is a possibility of destruction due to a withstand voltage deviation in the operation at X° C. or less.

Therefore, in order to consider the decrease in withstand voltage at the low temperature and to make the surge voltage $\Delta V$ at turn off extremely small, there is a need to connect a gate resistance to the gate of the IGBT, set the resistance value of this gate resistance large, and to dull the falling waveform of a signal voltage given to the gate due to the parasitic capacitance between the gate resistance and the gate-emitter of the IGBT. However, when the resistance value (gate resistance value) of the gate resistance is increased, a current cutoff speed when the IGBT is turned OFF becomes slow (di/dt is small), and as shown in FIG. 16, an operation loss (generated loss) which is generated will increase.

However, when the IGBT actually operates, it itself generates heat due to the operation loss (generated loss) generated as described above, so that the junction temperature gradually rises and the withstand voltage also rises accordingly. Therefore, the problem is most immediately after starting in a low temperature environment. However, there is a problem that as a matter of course, since it is necessary to cope with the operations in all situations, it is necessary to increase the resistance value of the gate resistance, and hence the device large in such a generated loss as shown in FIG. 16, i.e., low in efficiency is brought about.

In order to solve this problem, there has been developed an optimized circuit which takes the withstand voltage fluctuation due to the temperature into consideration by changing the resistance value of the gate resistance (input resistance) according to the temperature of the power semiconductor element (refer to, for example, Patent Document 3). However, even in that case, it becomes extremely important to grasp the accurate junction temperature in order to realize the optimum operation.

The present invention has been made to solve the above-mentioned conventional technical problems, and it is an object of the present invention to provide an inverter device capable of accurately protecting a power semiconductor element and further realizing an optimum operation considering a withstand voltage, and a vehicular electric compressor using the inverter device.

Means for Solving the Problems

An inverter device of the invention of claim 1 includes an inverter circuit having at least one power semiconductor element, and an inverter control unit to drive the power semiconductor element, and includes a temperature detector to detect a temperature in the vicinity of the power semiconductor element. The inverter device is characterized in that the inverter control unit includes a loss calculating unit to calculate a loss P of the power semiconductor element, and a junction temperature estimate calculating unit to add a temperature rise value $\Delta T$ obtained from the loss P of the power semiconductor element calculated by the loss calculating unit to the temperature Tth detected by the temperature detector to estimate a junction temperature Tj of the power semiconductor element, and in that when estimating the junction temperature Tj, the junction temperature estimate calculating unit performs a correction in the direction of excluding an influence of heat generation of other electronic components other than the power semiconductor element and/or a wiring pattern of a control board on the temperature detector.

The inverter device of the invention of claim 2 is characterized in that in the above invention, the temperature detector is arranged on the control board on which the other electronic components are mounted.

The inverter device of the invention of claim 3 is characterized in that in the above respective inventions, the junction temperature estimate calculating unit multiplies the loss P of the power semiconductor element by a predetermined thermal variable $\alpha$ to calculate the temperature rise value $\Delta T$, and changes the thermal variable $\alpha$, based on an operating state to perform a correction in the direction of excluding the influence of heat generation of the other electronic components and/or the wiring pattern of the control board on the temperature detector.

The inverter device of the invention of claim 4 is characterized in that in the above invention, the operating state includes any one of a power supply voltage, a phase current, and an input current, or a combination of them, or all of them.

The inverter device of the invention of claim 5 is characterized in that in the above invention, the thermal variable $\alpha$ is mapped as a value determined from at least two of the power supply voltage, the phase current, and the input current.

The inverter device of the invention of claim 6 is characterized in that in the invention of claim 4 or 5, the thermal variable $\alpha$ becomes larger as the power supply voltage becomes higher.

The inverter device of the invention of claim 7 is characterized in that in the invention of claim 4 or 5, the thermal variable $\alpha$ becomes smaller as the phase current increases.

The inverter device of the invention of claim 8 is characterized in that in the invention of claim 4 or 5, the thermal variable $\alpha$ becomes smaller as the input current increases.

The inverter device of the invention of claim 9 is characterized in that in the above respective inventions, when the junction temperature Tj of the power semiconductor element estimated by the junction temperature estimate calculating unit exceeds a predetermined value, the inverter control unit executes a predetermined protection operation.

A vehicular electric compressor of the invention of claim 10 includes a motor operated by the inverter device of each invention described above, and a housing in which the motor is accommodated, and is characterized in that the power semiconductor element is arranged in a heat exchange relationship with a low temperature portion of the housing.

A vehicular electric compressor of the invention of claim 11 includes an inverter device including an inverter circuit having at least one power semiconductor element, and an inverter control unit to drive the power semiconductor element, a motor operated by the inverter device, and a housing in which the motor is accommodated. The vehicular electric compressor resides in that the power semiconductor element is arranged in a heat exchange relationship with a suction refrigerant via the housing, and includes a temperature detector to detect a temperature in the vicinity of the power semiconductor element. The vehicular electric compressor is characterized in that the inverter control unit includes a loss calculating unit to calculate a loss P of the power semiconductor element, and a junction temperature estimate calculating unit to adds a temperature rise value $\Delta T$ obtained from the loss P of the power semiconductor element calculated by the loss calculating unit to the temperature Tth detected by the temperature detector to estimate a junction temperature Tj of the power semiconductor element, and in that when estimating the junction temperature Tj, the junction temperature estimate calculating unit corrects the junction temperature Tj in the direction of being lowered as the number of revolutions of the motor becomes higher.

The vehicular electric compressor of the invention of claim 12 is characterized in that in the above invention, the junction temperature estimate calculating unit multiplies the loss P of the power semiconductor element by a predetermined thermal variable $\alpha$ to calculate the temperature rise value $\Delta T$ and changes the thermal variable $\alpha$ so that the thermal variable $\alpha$ becomes smaller as the number of revolutions of the motor becomes higher.

The vehicular electric compressor of the invention of claim 13 is characterized in that in the invention of claim 11 or 12, when the junction temperature Tj of the power semiconductor element estimated by the junction temperature estimate calculating unit exceeds a predetermined value, the inverter control unit executes a predetermined protection operation.

The inverter device or the vehicular electric compressor of the invention of claim 14 is characterized in that in the above respective inventions, the inverter control unit has a gate resistance changing unit to change a resistance value of a gate resistance of the power semiconductor element, and the gate resistance changing unit changes the resistance value of the gate resistance of the power semiconductor element, based on the junction temperature Tj of the power semiconductor element estimated by the junction temperature estimate calculating unit.

The inverter device or the vehicular electric compressor of the invention of claim 15 is characterized in that in the above invention, the gate resistance changing unit increases the resistance value of the gate resistance of the power semiconductor element as the junction temperature Tj of the power semiconductor element estimated by the junction temperature estimate calculating unit becomes lower, and decreases the resistance value of the gate resistance of the power semiconductor element as the junction temperature Tj of the power semiconductor element estimated by the junction temperature estimate calculating unit becomes higher.

The inverter device or the vehicular electric compressor of the invention of claim 16 is characterized in that in the invention of claim 14 or 15, the gate resistance changing unit has a variable resistance device connected to a gate of the power semiconductor element, and changes a resistance value of the variable resistance device, based on the junction temperature Tj of the power semiconductor element estimated by the junction temperature estimate calculating unit.

The inverter device or the vehicular electric compressor of the invention of claim 17 is characterized in that in the above invention, the gate resistance changing unit increases the resistance value of the variable resistance device as the junction temperature Tj of the power semiconductor element estimated by the junction temperature estimate calculating unit becomes lower, and decreases the resistance value of the variable resistance device as the junction temperature Tj of the power semiconductor element estimated by the junction temperature estimate calculating unit becomes higher.

The inverter device or the vehicular electric compressor of a disclosed embodiment of the invention is characterized in that in another disclosed embodiment of the invention, the variable resistance device includes an ON signal generating switch connected to the gate of the power semiconductor element and for inputting an ON signal to the gate, a plurality of OFF signal generating switches each connected to the gate of the power semiconductor element and for inputting an OFF signal to the gate, and a plurality of resistance elements different in resistance value, which are respectively connected to the OFF signal generating switches, and in that when the power semiconductor element is turned OFF, the gate resistance changing unit switches and turns ON each of the OFF signal generating switches, based on the junction temperature Tj of the power semiconductor element estimated by the junction temperature estimate calculating unit to change the resistance value of the gate resistance of the power semiconductor element.

The inverter device or the vehicular electric compressor of a disclosed embodiment of the invention is characterized in that in the above invention, when the junction temperature Tj of the power semiconductor element estimated by the junction temperature estimate calculating unit is less than or equal to a predetermined value T1, the gate resistance changing unit turns ON the OFF signal generating switch to which the resistance element large in resistance value is connected, and when the junction temperature Tj of the power semiconductor element estimated by the junction temperature estimate calculating unit is greater than or equal to a predetermined value T2 higher than the predetermined value T1, the gate resistance changing unit turns ON the OFF signal generating switch to which the resistance element small in resistance value is connected.

Advantageous Effect of the Invention

According to the invention of claim 1, there is provided an inverter device including an inverter circuit having at least one power semiconductor element, and an inverter control unit to drive the power semiconductor element, and in which a temperature detector to detect a temperature in the vicinity of the power semiconductor element is provided. The inverter control unit includes a loss calculating unit to calculate a loss P of the power semiconductor element, and a junction temperature estimate calculating unit to add a temperature rise value ΔT obtained from the loss P of the power semiconductor element calculated by the loss calculating unit to the temperature Tth detected by the temperature detector to estimate a junction temperature Tj of the power semiconductor element. When estimating the junction temperature Tj, the junction temperature estimate calculating unit performs a correction in the direction of excluding an influence of heat generation of other electronic components other than the power semiconductor element and/or a wiring pattern of a control board on the temperature detector. Therefore, in particular, in the cases such as when the temperature detector is arranged on the control board as in the invention of claim 2, it is possible to eliminate the influence of the heat generated by other electronic components other than the power semiconductor element and a wiring pattern on the temperature detector and more accurately estimate the junction temperature Tj of the power semiconductor element.

Thus, even when the protection operation is executed as in the invention of claim 9, it is possible to expand the usable area of the power semiconductor element, thereby making it possible to reduce the rating of each component and achieve miniaturization and low cost.

Further, as in the invention of claim 3, if the junction temperature estimate calculating unit multiplies the loss P of the power semiconductor element by the predetermined thermal variable α to calculate the temperature rise value ΔT, and changes the thermal variable α, based on the operating state, it is possible to smoothly exclude the influence of the heat generated by other electronic components and/or the wiring pattern of the control board on the temperature detector.

As the operating state in this case, the power supply voltage, the phase current, and the input current can be adopted as in the invention of claim 4. Further, as in the invention of claim 5, the thermal variable α is mapped as a value determined from at least two of the power supply voltage, the phase current, and the input current, whereby it is possible to appropriately set the thermal variable α according to each operating state related to each other.

Here, the higher the power supply voltage, the higher the junction temperature Tj of the power semiconductor element, so that the thermal influence from other electronic components and each wiring pattern becomes relatively small. Therefore, as the power supply voltage becomes higher as in the invention of claim 6, the thermal variable α is made larger, so that the accurate junction temperature Tj can be estimated.

Also, the larger the phase current, the greater the heat generated by other electronic components and the wiring pattern, so that the heat transferred to the temperature detector is also increased. Therefore, as in the invention of claim 7, the thermal variable α is made smaller as the phase current becomes larger, so that the accurate junction temperature Tj can be estimated.

Further, even when the input current is large, the heat generated by the wiring pattern increases, and the heat transferred to the temperature detector also increases. Therefore, as the input current becomes larger as in the invention of claim 8, the thermal variable α is made smaller, so that the accurate junction temperature Tj can be estimated.

Then, in the vehicular electric compressor as in the invention of claim 10 used under a high temperature environment, it is possible to realize extremely effective superheat protection by operating the motor by the inverter device of each invention described above.

On the other hand, in the vehicular electric compressor as in the invention of claim 11, the higher the number of revolutions of the motor, the cooling capacity by the suction refrigerant. That is, since the junction temperature Tj of the power semiconductor element provided in the heat exchange relationship with the suction refrigerant via the housing is lowered, the junction temperature Tj is corrected in the direction of being lowered as the number of revolutions of the motor becomes higher, so that the accurate junction temperature Tj can be estimated.

Also in this case, as in the invention of claim 12, if the junction temperature estimate calculating unit calculates the temperature rise value ΔT by multiplying the loss P of the power semiconductor element by a predetermined thermal variable α, and changes the thermal variable α so that the thermal variable α is made smaller as the number of revolutions of the motor becomes higher, it is possible to smoothly estimate the accurate junction temperature Tj.

Thus, even when the protection operation is executed as in the invention of claim 13, the usable area of the power semiconductor element can be expanded in the same manner, thereby making it possible to reduce the rating of each component and achieve miniaturization and low cost.

As described above, according to the inventions of claims 1 to 13, the junction temperature Tj of the power semiconductor element can be estimated accurately, so that it is possible to accurately grasp a fluctuation of the withstand voltage of the power semiconductor element.

Thus, as in the invention of claim 14, the inverter control unit is provided with a gate resistance changing unit to change the resistance value of the gate resistance of the power semiconductor element, and the resistance value of the gate resistance of the power semiconductor element is changed by the gate resistance changing unit, based on the junction temperature Tj of the power semiconductor element estimated by the junction temperature estimate calculating unit, whereby it is possible to realize the optimum operation considering the withstand voltage of the power semiconductor element.

For example, as in the invention of claim 15, if the gate resistance changing unit increases the resistance value of the gate resistance of the power semiconductor element as the junction temperature Tj of the power semiconductor element estimated by the junction temperature estimate calculating unit becomes lower, and decreases the resistance value of the gate resistance of the power semiconductor element as the junction temperature Tj of the power semiconductor element estimated by the junction temperature estimate calculating unit becomes higher, it is possible to increase the resistance value of the gate resistance to reduce the surge voltage in a situation in which the junction temperature TJ is low and the withstand voltage of the power semiconductor element is lowered, and decrease the resistance value of the gate resistance to reduce the generated loss in a situation in which the junction temperature Tj is high and the withstand voltage of the power semiconductor element rises.

Thus, it is possible to suppress the generated loss and realize an efficient operation while avoiding the destruction of the power semiconductor element due to the surge voltage.

Specifically, for example, as in the invention of claim 16, the gate resistance changing unit is provided with a variable resistance device connected to the gate of the power semiconductor element and changes a resistance value of the variable resistance device, based on the junction temperature Tj of the power semiconductor element estimated by the junction temperature estimate calculating unit. And also, as in the invention of claim 17, the gate resistance changing unit increases the resistance value of the variable resistance device as the junction temperature Tj of the power semiconductor element estimated by the junction temperature estimate calculating unit becomes lower, and decreases the resistance value of the variable resistance device as the unction temperature Tj of the power semiconductor element estimated by the junction temperature estimate calculating unit becomes higher, whereby it is possible to realize both prevention of destruction of the power semiconductor element due to the surge voltage and suppression of the generated loss of the power semiconductor element.

More specifically, for example, as in a disclosed embodiment of the invention, the variable resistance device is provided with an ON signal generating switch connected to the gate of the power semiconductor element and for inputting an ON signal to the gate, a plurality of OFF signal generating switches each connected to the gate of the power semiconductor element and for inputting an OFF signal to the gate, and a plurality of resistance elements different in resistance value, which are respectively connected to the OFF signal generating switches. When the power semiconductor element is turned OFF, the gate resistance changing unit switches and turns ON each of the OFF signal generating switches, based on the junction temperature Tj of the power semiconductor element estimated by the junction temperature estimate calculating unit to change the resistance value of the gate resistance of the power semiconductor element. And also, as in a disclosed embodiment of the invention, when the junction temperature Tj of the power semiconductor element estimated by the junction temperature estimate calculating unit is less than or equal to a predetermined value T1, the gate resistance changing unit turns ON the OFF signal generating switch to which the resistance element large in resistance value is connected, and when the junction temperature Tj of the power semiconductor element estimated by the junction temperature estimate calculating unit is greater than or equal to a predetermined value T2 higher than the predetermined value T1, the gate resistance changing unit turns ON the OFF signal generating switch to which the resistance element small in resistance value is connected. Consequently, it is possible to realize both prevention of destruction of the power semiconductor element due to the surge voltage when the power semiconductor element is turned OFF, and suppression of the generated loss of the power semiconductor element.

BRIEF DESCRIPTION OF THE DRAWINGS

FIG. 8 is a thermal circuit diagram for describing the relationship between the battery voltage and the thermal variable α;

FIG. 9 is a graph describing the relationship between an input current and a thermal variable α;

MODE FOR CARRYING OUT THE INVENTION

Hereinafter, embodiments of the present invention will be described in detail with reference to the drawings.

Embodiment 1

(1) Vehicular Electric Compressor 1

Figure 1:
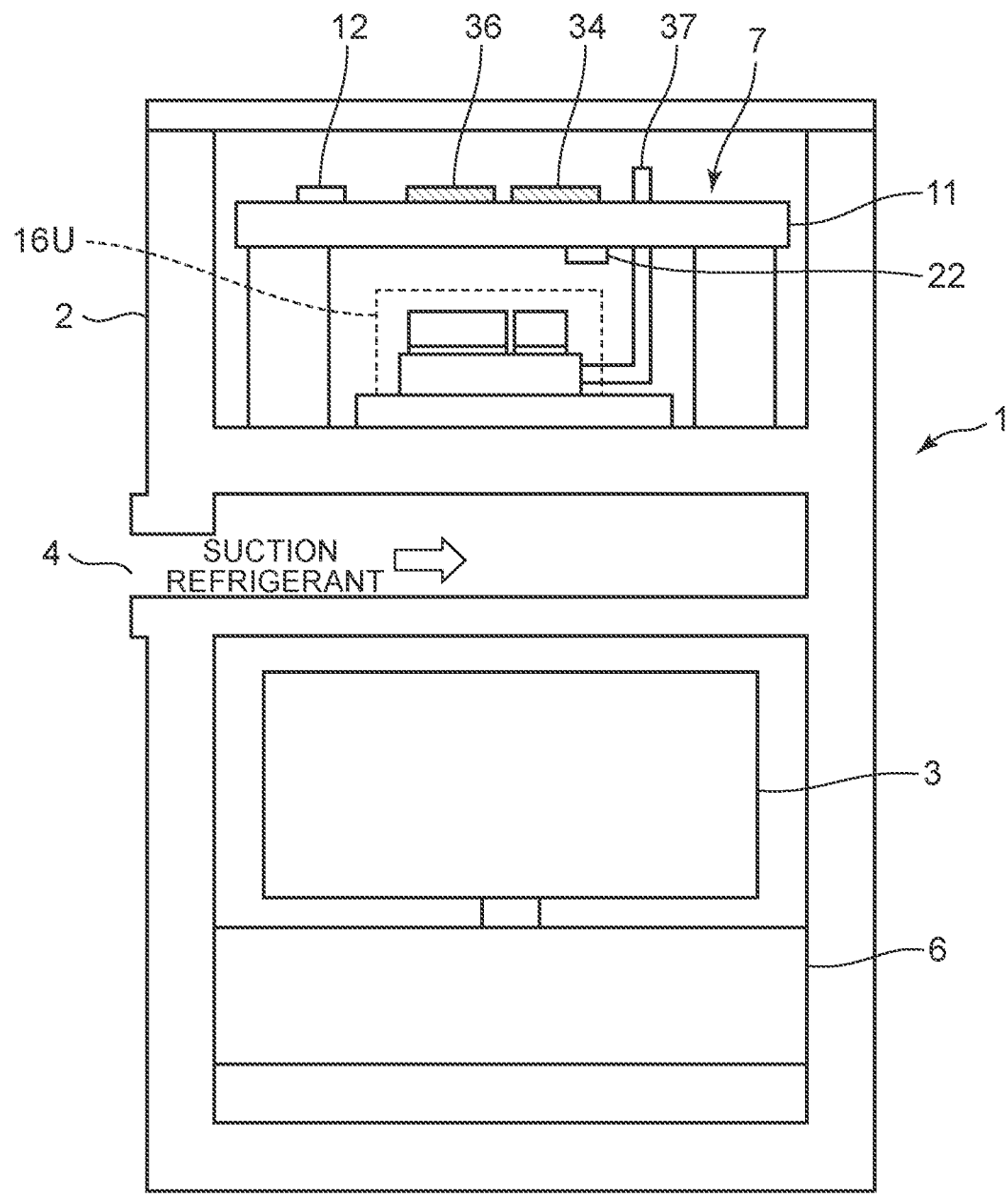
FIG. 1 is a schematic cross-sectional view of a vehicular electric compressor of one embodiment to which an inverter device of the present invention is applied.

FIG. 1 shows a schematic cross-sectional view of a vehicular electric compressor 1 to which the present invention is applied. The electric compressor 1 of the embodiment constitutes a part of a refrigerant circuit of an air conditioner which air-conditions the interior of an unillustrated vehicle, and is mounted in an engine room of the vehicle. The electric compressor 1 includes a motor 3 and a compression element 6 such as a scroll type driven by a rotating shaft of the motor 3 in a metallic housing 2. Further, an inverter device 7 of the present invention is attached to the housing 2, and the motor 3 is operated by the inverter device 7 to drive the compression element 6. The compression element 6 is driven by the rotating shaft of the motor 3 to suck and compress a refrigerant from a refrigerant circuit from a suction port 4 and discharge it to the refrigerant circuit again from an unillustrated discharge port.

In the figure, 11 is a control board (made of resin) of the inverter device 7. A wiring pattern 34 through which a phase current flows, and a wiring pattern 36 through which an input current flows are printed on the control board 11. Further, 16U in the figure is a power semiconductor element constituting the inverter circuit 8 of the inverter device 7, and its terminal 37 is connected to the control board 11. In this case, the power semiconductor element 16U (the same applies to the other power semiconductor elements 16V, 16W, 17U, 17V, and 17W described later) is arranged in a heat exchange relationship with the vicinity of the suction port 4 of the housing 2 (low temperature portion of the housing 2). Thus, the power semiconductor elements 16U, 16V, 16W, 17U, 17V, and 17W are arranged in a heat exchange relationship with the low-temperature suction refrigerant via the housing 2.

Further, in the figure, 22 is a temperature sensor as a temperature detector, which is arranged on the control board 11 and is located in the vicinity of the power semiconductor elements 16U, 16V, and 16W, and 17U, 17V, and 17W. Further, electronic components other than power semiconductor elements such as an inverter control unit 12 and a smoothing capacitor 9, which will be described later, are also arranged on the control board 11.

(2) inverter Device 7

Figure 2:
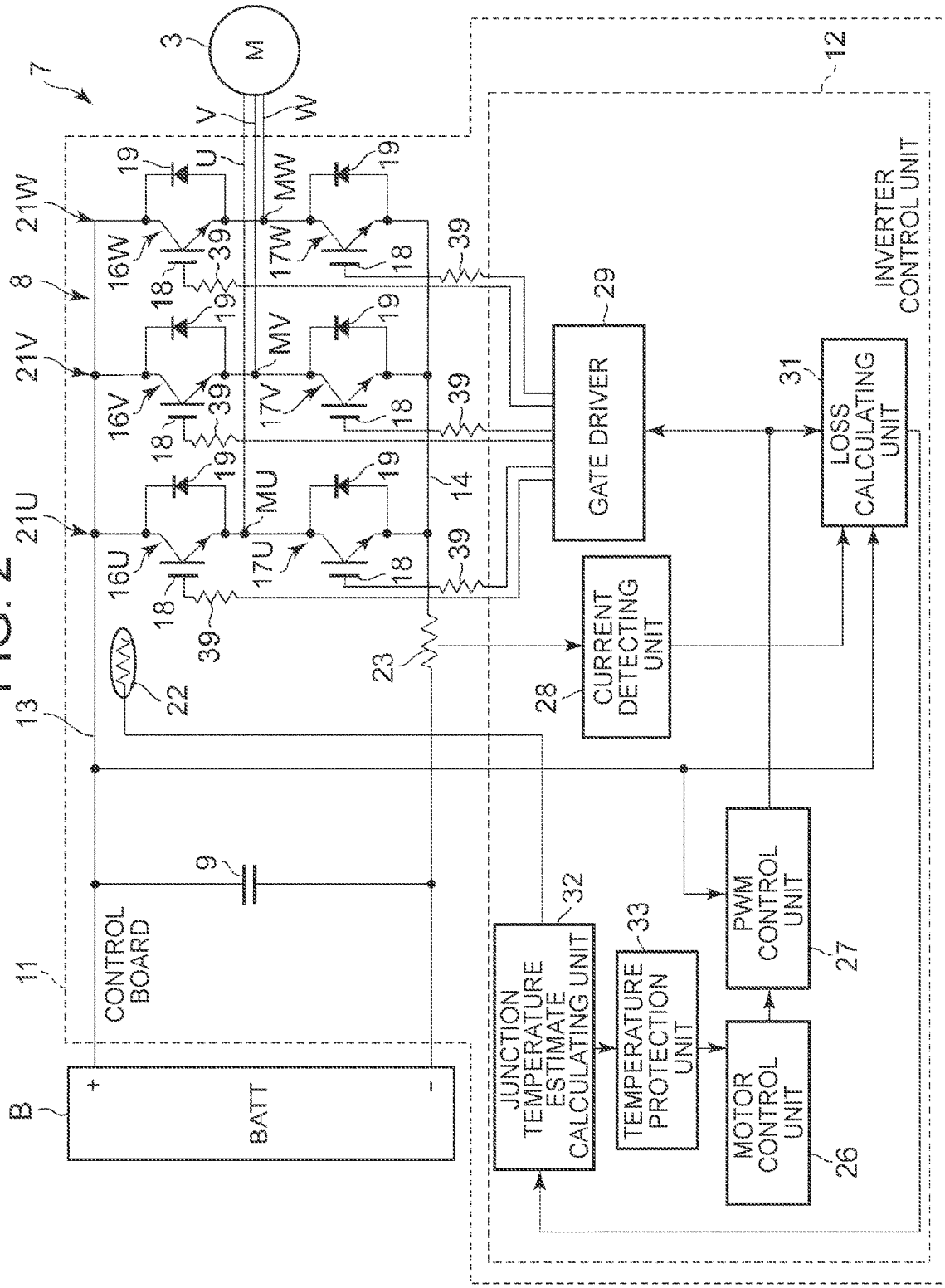
FIG. 2 is an electric circuit diagram of the inverter device of one embodiment of the present invention.

Next, FIG. 2 shows an electric circuit diagram of the inverter device 7. The inverter device 7 of the embodiment includes the control board 11 to which the smoothing capacitor 9 and wiring patterns 34 and 36 described above are mounted and to which the inverter circuit 4 is connected, and the inverter control unit 12 configured by a microcomputer (processor). A DC bus 13 on the positive side of the inverter circuit 8 is connected to a + terminal of a high voltage battery (HV power supply for the vehicle) B mounted on the vehicle, and a DC bus 14 on the negative side is connected to a − terminal of the high voltage battery B. Then, the smoothing capacitor 9 is connected between the two DC buses 13 and 14 of the inverter circuit 8. A circuit from the smoothing capacitor 9 to the inverter circuit 8 serves as a wiring bus bar.

(3) Inverter Circuit 8

The inverter circuit 3 changes a switching state of each of the plurality of power semiconductor elements constituting a bridge, converts a direct current applied from the high voltage battery B into an alternating current, and supplies the same to the motor 3. Specifically, the inverter circuit 8 includes the three power semiconductor elements 16U, 16V, and 16W constituting an upper phase of the bridge and the three power semiconductor elements 17U, 17V, and 17W constituting a lower phase of the bridge. Each of the power semiconductor elements 16U, 16V, and 16W, and 17U, 17V, and 17W is a composite of a semiconductor switching element 18 and a flywheel diode 19 connected in antiparallel to the semiconductor switching element 18. DC power is supplied from the high voltage battery B to the DC buses 13 and 14 of the inverter circuit B.

In the inverter circuit 8, the semiconductor switching elements 18 of the power semiconductor elements 16U, 16V, and 16W of the upper layer, and the semiconductor switching elements 18 of the power semiconductor elements 17U, 17V, and 17W of the lower phase are respectively connected in series in one-to-one correspondence. Hereinafter, the pair of each semiconductor switching element 18 of the power semiconductor elements 16U to 17W connected in series is referred to as a switching leg. That is, in the embodiment, there are the switching leg 21U comprised of a pair of the semiconductor switching element 18 of the power semiconductor element 16U and the semiconductor switching element 18 of the power semiconductor element 17U, the switching leg 21V comprised of a pair of the semiconductor switching element 18 of the power semiconductor element 16V and the semiconductor switching element 18 of the power semiconductor element 17V, and the switching leg 21W comprised of a pair of the semiconductor switching element 18 of the power semiconductor element 16W and the semiconductor switching element 18 of the power semiconductor element 17W.

These switching legs 21U, 21V, and 21W are connected between the DC bus 13 on the positive side and the DC bus 14 on the negative side, respectively. Further, intermediate points MU, MV, and MW of the respective switching legs 21U, 21V, and 21W are nodes which output phase voltages Vu, Vv, and Vw of each phase (U phase, V phase, W phase) of an output AC. Each of the intermediate points MU, MV, and MW is connected to each phase of the motor 3.

In the inverter circuit 8 of the embodiment, the semiconductor switching element 18 uses an IGBT (Insulated Gate Bipolar Transistor). Incidentally, the semiconductor switching element 18 is not limited to the IGBT, but may be a MOSFET or the like. Further, as described above, the temperature sensor 22 is mounted on the control board 11 with being located in the vicinity of the power semiconductor elements 16U to 17W. In the embodiment, the temperature sensor 22 is comprised of a thermistor.

Further, a shunt resistance 23 as a phase current detector is connected to the DC bus 14 on the negative side at a position where a current from the motor 3 flows. When the current from the motor 3 flows through the shunt resistance 23, a potential difference is developed across the shunt resistance 23, and phase currents Iu, Iv, and Iw can be calculated by detecting the voltage across the shunt resistance 23. Incidentally, the phase current detector is not limited to the shunt resistance, but may be configured by a current transformer or the like.

(4) Inverter Control Unit 12

On the other hand, the inverter control unit 12 includes a motor control unit 26, a PWM control unit 27, a current detecting unit 28, a gate driver 29, a loss calculating unit 31, a junction temperature estimate calculating unit 32, and a temperature protection unit 33. Then, a battery (HV) voltage (power supply voltage) Vb of the DC bus 13 on the positive side is input to the PWM control unit 27 and the loss calculating unit 31.

(5) Motor Control Unit 26

The motor control unit 26 outputs a target waveform (modulated wave) of a three-phase sine wave applied to the motor 3 to the PWM control unit 27. The PWM control unit 27 generates a duty (Duty: ON time) which is a drive signal by comparing the height of a carrier (triangular wave) with that of the modulated wave output by the motor control unit 26. This duty is generated for each of the U-phase, V-phase, and W-phase, and is sent to the gate driver 29 which drives (ON-OFF) the gate of each semiconductor switching element 18. The gate driver 29 which has received the drive signal generates a signal for turning ON the semiconductor switching element 18 (IGBT) and a signal for turning it OFF according to the rising and falling of the drive signal. The outputs (six outputs) of the gate driver 29 are connected to the gates of the semiconductor switching elements 18 via gate resistances 39, respectively. A signal voltage having a rising edge and a falling edge is applied to the gate of each semiconductor switching element 18 to thereby switch (ON-OFF) each semiconductor switching element.

Incidentally, the frequency of each of the phase currents Iu, Iv, and Iw, which is the revolution speed of the motor 3 of the embodiment ranges from 400 Hz to 500 Hz, and the cycle (hereinafter referred to as a PWM carrier cycle) of the carrier in the PWM control unit 27 is 20 kHz sufficiently smaller (or sufficiently shorter) than that. Further, the thermal time constant of each of the power semiconductor elements 16U to 17W (the time required for transmission to the temperature sensor 22 as a temperature rise value for the loss) is about 50 msec, and the PWM carrier cycle is sufficiently shorter than this thermal time constant (or sufficiently earlier than it).

The current detecting unit 28 inputs the voltage between both ends of the shunt resistance 23 and calculates the phase currents Iu, Iv, and Iw from the resistance value of the shunt resistance 23. The calculated phase currents Iu, Iv, and Iw are input to the loss calculating unit 31.

(6) Loss Calculating Unit 31

The loss calculating unit 31 calculates the loss of each of the power semiconductor elements 16U to 17W, based on the phase currents Iu, Iv, and Iw of each phase of the U phase, V phase, and W phase input from the current detecting unit 28, and the HV voltage (applied voltage) of the DC bus 13 on the positive side, and the duty input from the PWM control unit 27. In the case of the embodiment, the loss calculating unit 31 calculates the switching loss of the semiconductor switching elements 18 constituting the power semiconductor elements 16U to 17W and the steady loss (conduction loss or energization loss) thereof, and the switching loss of the flywheel diodes 19 and the steady loss (conduction loss or energization loss) thereof respectively separately.

The switching loss of each semiconductor switching element 18 and the steady loss thereof correspond to the loss of the semiconductor switching element 18 and become the amount of heat generated by the semiconductor switching element 18. Further, the switching loss of the flywheel diode 19 and the steady loss (conduction loss or energization loss) thereof correspond to the loss of the flywheel diode 19 and become the amount of heat generated by the flywheel diode 19. Then, these become a loss P of each power semiconductor element 16U to 17W. The loss P of each power semiconductor element 16U to 17W calculated by the loss calculating unit 31 is input to the junction temperature estimate calculating unit 32.

Further, in the embodiment, in addition to the battery voltage Vb and phase currents Iu, Iv, and Iw described above, information on the input current Iin and the revolution speed NC of the motor 3 is also transmitted from the loss calculating unit 31 to the junction temperature estimate calculating unit 32.

(7) Junction Temperature Estimate Calculating Unit 32

The junction temperature estimate calculating unit 32 adds a temperature rise value ΔT obtained from the loss P of each power semiconductor element 16U to 17W calculated by the loss calculating unit 31 to a temperature Tth in the vicinity of the power semiconductor elements 16U to 17W detected by the temperature sensor 22 to calculate an estimated value of a junction temperature Tj of the semiconductor switching element 18 of each power semiconductor element 16U to 17W.

In this case, the junction temperature estimate calculating unit 32 calculates the temperature rise value ΔT by multiplying (doing a predetermined thermal variable α times the loss P) the loss P of each power semiconductor element 16U to 17W calculated by the loss calculating unit 31 by the predetermined thermal variable α. Expressing the estimation calculation in the above junction temperature estimate calculating unit 32 as a formula is given like the following equations (1) and (2).

$$Tj = Tth + \Delta T \quad (1)$$

$$\Delta T = \alpha \times P \quad (2)$$

The thermal variable α will be described in detail later. Then, the calculated junction temperature Tj is input to the temperature protection unit 33.

(8) Temperature Protection Unit 33

The temperature protection unit 33 executes a predetermined protection operation based on the junction temperature Tj of the semiconductor switching element 18 of each power semiconductor element 16U to 17W estimated by the junction temperature estimate calculating unit 32. This protection operation is divided into two stages in the embodiment. First, when the highest junction temperature TJ of any of the power semiconductor elements 16U to 17W exceeds a first predetermined value TS1, the temperature protection unit 33 outputs a current limit signal to the motor control unit 26.

When the motor control unit 26 receives the current limit signal from the temperature protection unit 33, the motor control unit 26 adjusts the modulated wave so as to limit the current flowing through the inverter circuit 8 to a predetermined value. Further, when the highest junction temperature Tj exceeds a second predetermined value TS2 higher than the first predetermined value TS1, the temperature protection unit 33 outputs a current cutoff signal to the motor control unit 26. When the motor control unit 26 receives the current cutoff signal from the temperature protection unit 33, the motor control unit 26 stops the output of the modulated wave to turn OFF all the semiconductor switching elements 18 of the power semiconductor elements 16U to 17W and thereby to cut off the current flowing through the inverter circuit 8. These first and second predetermined value TS1 and TS2 are values set from the temperature limits of the semiconductor switching elements 18 constituting the power semiconductor elements 16U to 17W.

(9) Change of Thermal Variable α by Junction Temperature Estimate Calculating Unit 32 (Part 1)

Next, description will be made about an example of control of changing the thermal variable α of the above-mentioned equation (2) by the junction temperature estimate calculating unit 32 of the inverter control unit 12 with reference to FIGS. 3 to 8. As described above, the wiring pattern 34 through which the phase current (Iu, Iv, Iw) flows, the wiring pattern 36 through which the input current fin flows, and the electronic components other than the power semiconductor elements 16U to 17W, such as the inverter control unit 12, the smoothing capacitor 9, etc. are mounted on the control board 1I.

These electronic components (12, 9) and wiring patterns (34, 36) generate heat when the inverter device 7 is energized and the motor 3 is operated. Since the generated heat is also transferred to the temperature sensor 22 also arranged on the control board 11, the temperature Tth detected by the temperature sensor 22 rises under the influence of the generated heat. Therefore, if the temperature rise value ΔT converted from the loss P of each power semiconductor element 16U to 17W is simply added to the temperature Tth detected by the temperature sensor 22 as in the above-mentioned equation (1), the junction temperature Tj is calculated higher than the actual temperature, and hence the above-mentioned protection operation will be executed at an unnecessarily early stage.

Therefore, the junction temperature estimate calculating unit 32 of the embodiment multiplies the loss P by the predetermined thermal variable α and changes the thermal variable α according to the operating state, as described in the above equation (2), thereby correcting the junction temperature Tj in the direction of excluding the influence of the heat generated by the electronic components (12, 9) and wiring patterns (34, 36) on the temperature sensor 22 as described above.

Figure 3:
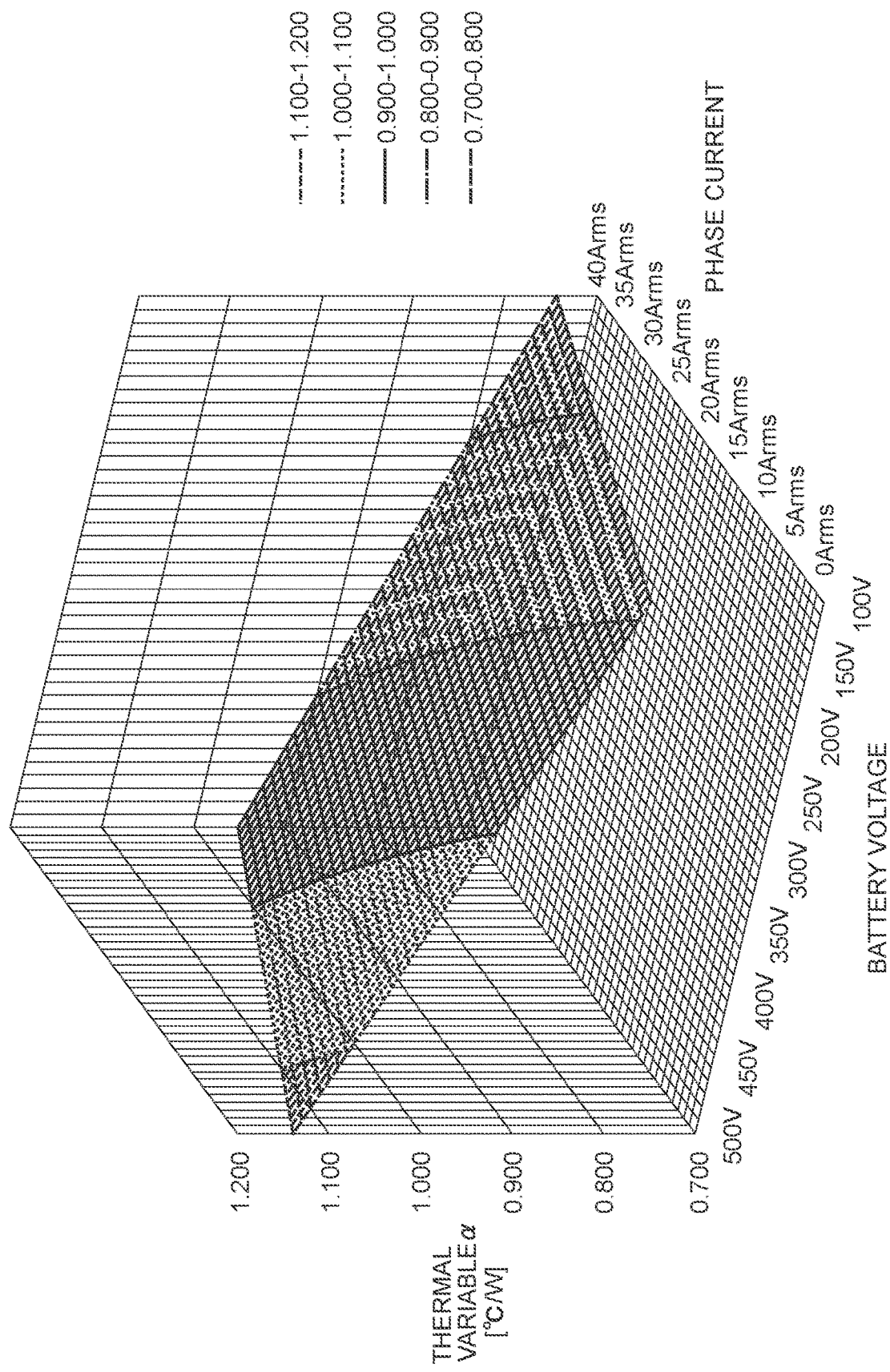
FIG. 3 is a diagram showing a 3-dimensional map of a thermal variable α determined from a battery voltage and a phase current possessed by a junction temperature estimate calculating unit of the inverter device of FIG. 2 (embodiment 1)

Actually, in this embodiment, the battery voltage Vb (power supply voltage) and the phase current (Iu, Iv, Iw) are adopted as the operating states, and the thermal variable α is determined based on these. In this embodiment, the thermal variable α is mapped as shown in FIG. 3 as a value determined from the battery voltage Vb and the phase current (Iu, Iv, Iw) (3-dimensional map), and is previously stored in the junction temperature estimate calculating unit 32. Incidentally, the 3-dimensional map of FIG. 3 is a value obtained in advance by an experiment for the vehicular electric compressor 1.

(9-1) Relationship Between Phase Current (Iu, Iv, Iw) and Thermal Variable α

Figure 4:
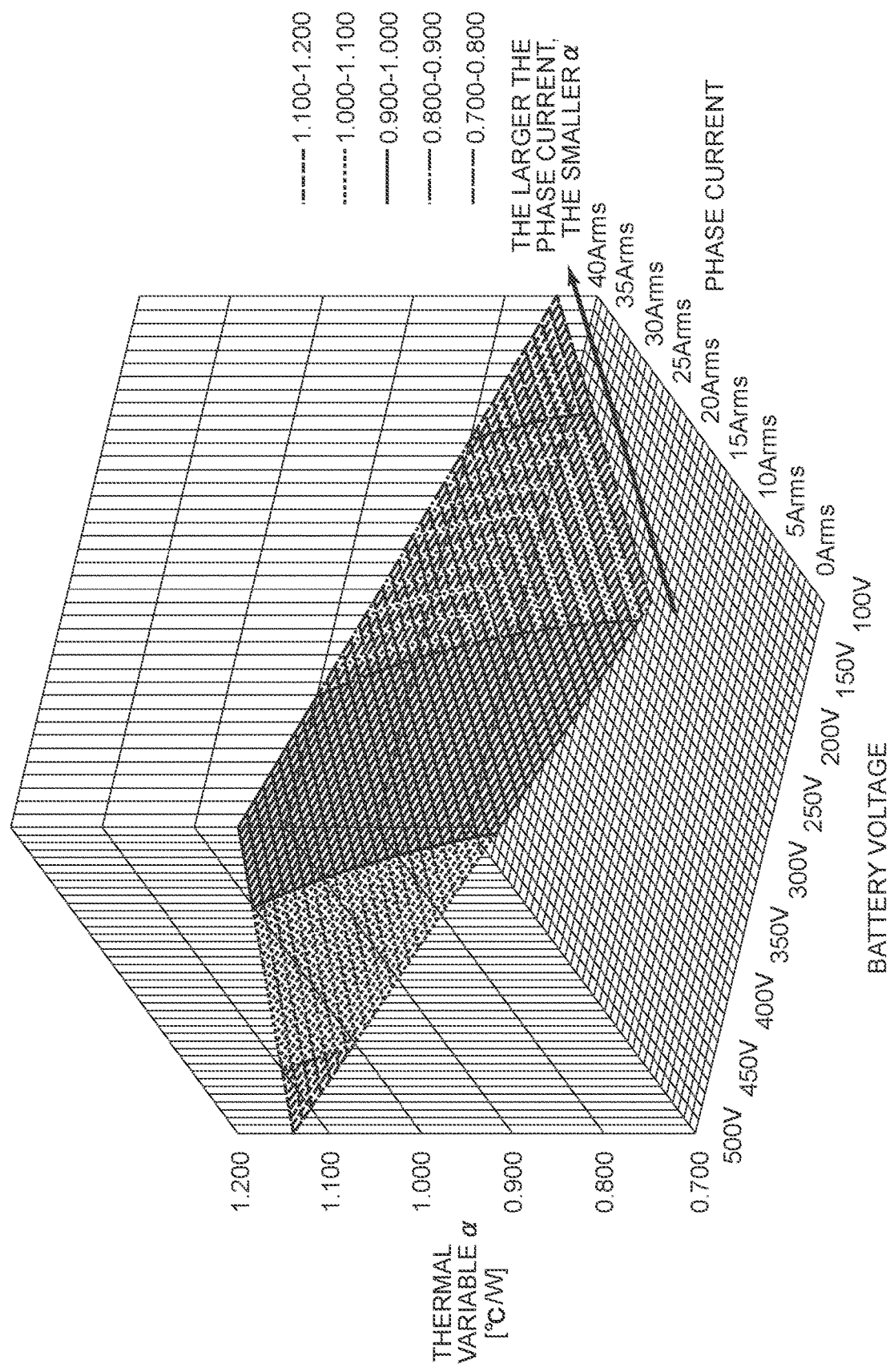
FIG. 4 is a 3-dimensional map describing the relationship between the phase current and the thermal variable α.

Next, description will be made about the relationship between the phase current (Iu, Iv, Iw) and the thermal variable α with reference to FIGS. 4 to 6. Incidentally, as the phase current in this case, for example, the effective value of each of the phase currents Iu, Iv, and Iw is used. Then, when the phase current flows through each of the power semiconductor elements 16U to 17W, the wiring pattern 34 also generates heat. Therefore, as shown in FIG. 4, a 3-dimensional map is configured so that the larger the phase current, the smaller the thermal variable α. The reason will be described with reference to FIGS. 5 and 6.

Figure 5:
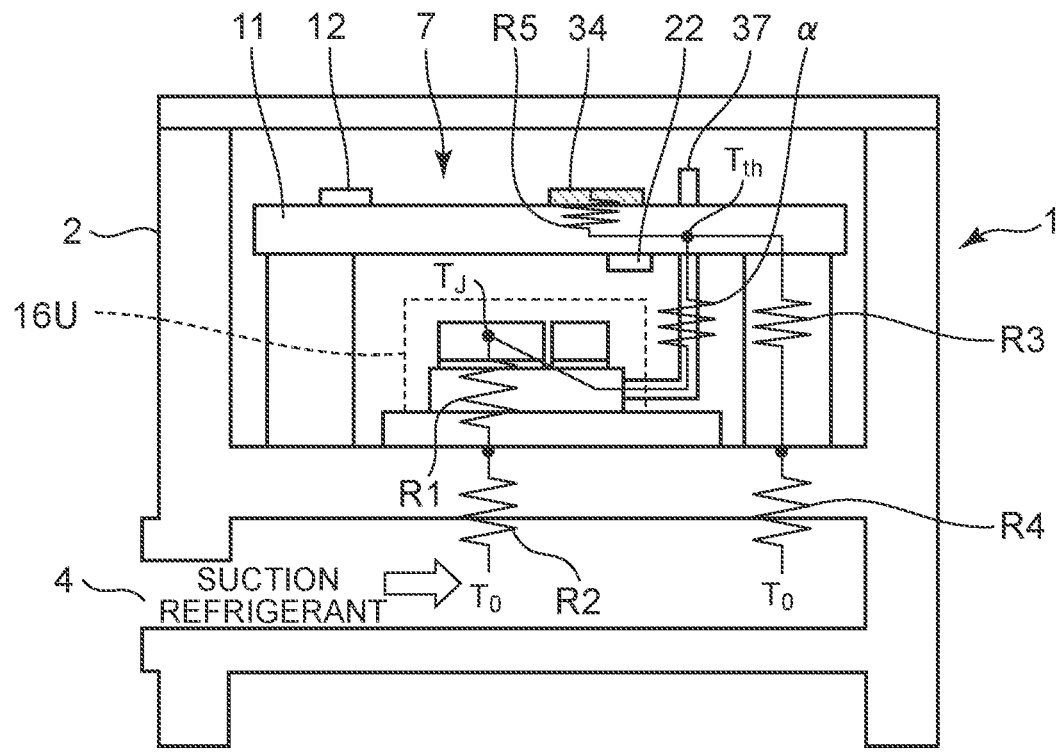
FIG. 5 is a fragmentary cross-sectional view of the vehicular electric compressor for describing the relationship between the phase current and the thermal variable α.

The transfer of heat in the vehicular electric compressor 1 of FIG. 5 can be considered by replacing it with an electric circuit. In that case, a heat source such as each of the power semiconductor elements 16U to 17W, the wiring pattern 34 or the like becomes a current source as shown in FIG. 6. The thermal resistances of each element and the housing become resistances R1 to R5. Incidentally, the resistance between the junction temperature Tj and the temperature Tth detected by the temperature sensor 22 becomes the thermal variable α.

The larger the phase current, the larger the heat generated by the wiring pattern 34, and the temperature Tth detected by the temperature sensor 22 rises depending on the amount of heat generated. Therefore, the thermal variable α is reduced as the phase current increases, so that the accurate junction temperature Tj excluding the thermal influence from the wiring pattern 34 can be estimated.

(9-2) Relationship Between Battery Voltage Vb (Power Supply Voltage) and Thermal Variable α

Figure 7:
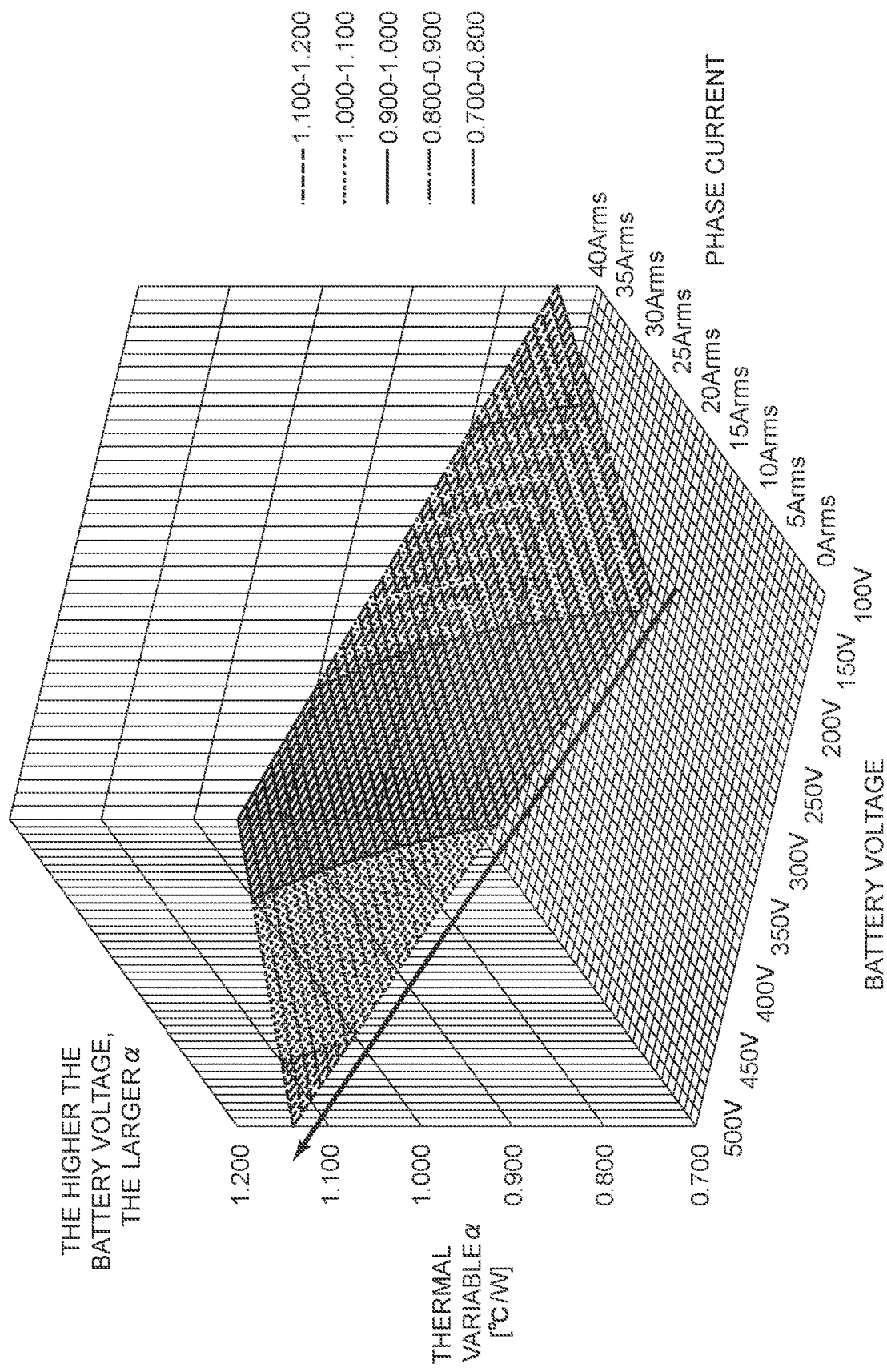
FIG. 7 is a 3-dimensional map describing the relationship between the battery voltage (power supply voltage) and the thermal variable α.

Next, description will be made about the relationship between the battery voltage Vb (power supply voltage) and the thermal variable α with reference to FIGS. 7 and 8. The higher the battery voltage Vb, the larger the amount of heat generated by each of the power semiconductor elements 16U to 17W. Therefore, since the thermal influence from other electronic components and the wiring pattern 34 becomes relatively small, a 3-dimensional map is configured so that as shown in FIG. 7, the higher the battery voltage Vb, the larger the thermal variable α. The reason will be described with reference to FIG. 8.

Incidentally, in the following description, it is assumed that 90% of the amount of heat (the current value of the thermal circuit in FIG. 8) in the power semiconductor elements 16U to 17W is taken away by the suction refrigerant through the housing 2, and the remaining 10% is transmitted to the terminal 37. Further, assuming that the amount of heat generated in the power semiconductor elements 16U to 17W when the battery voltage Vb is high, is 50 W (considered to be 50 A by replacing with the current) and 25 W (also considered to be 25 A) when the battery voltage Vb is low, the phase current is the same 10 Arms in both cases, the resistance R1+the resistance R2 is taken as a resistance group X, and the resistance R3+the resistance R4 is taken as a resistance group Y, the junction temperature Tj when the battery voltage Vb is high, the temperature Tth detected by the temperature sensor 22, and the thermal variable α are as follows:

$$Tj=45X$$

$$Tth=(50\times0.1+0.1)Y=5.1Y$$

$$\alpha=(Tj-Tth)/50=(45X-5.1Y)/50$$

$$=0.9X-0.102Y \quad (3)$$

On the other hand, the junction temperature Tj when the battery voltage Vb is low, the temperature Tth detected by the temperature sensor 22, and the thermal variable α are as follows:

$$Tj=22.5X$$

$$Tth=(25\times0.1+0.1)Y=2.6Y$$

$$\alpha=(Tj-Tth)/25=(22.5X-2.6Y)/25$$

$$=0.9X-0.104Y \quad (4)$$

As is clear from the above equations (3) and (4), the thermal variable α becomes larger as the battery voltage Vb is higher. Therefore, even in the 3-dimensional map of FIG. 3, the accurate junction temperature Tj can be estimated by increasing the thermal variable α as the battery voltage Vb becomes higher as shown in FIG. 7.

(10) Change of Thermal Variable α by Junction Temperature Estimate Calculating Unit 32 (Part 2)

Figure 10:
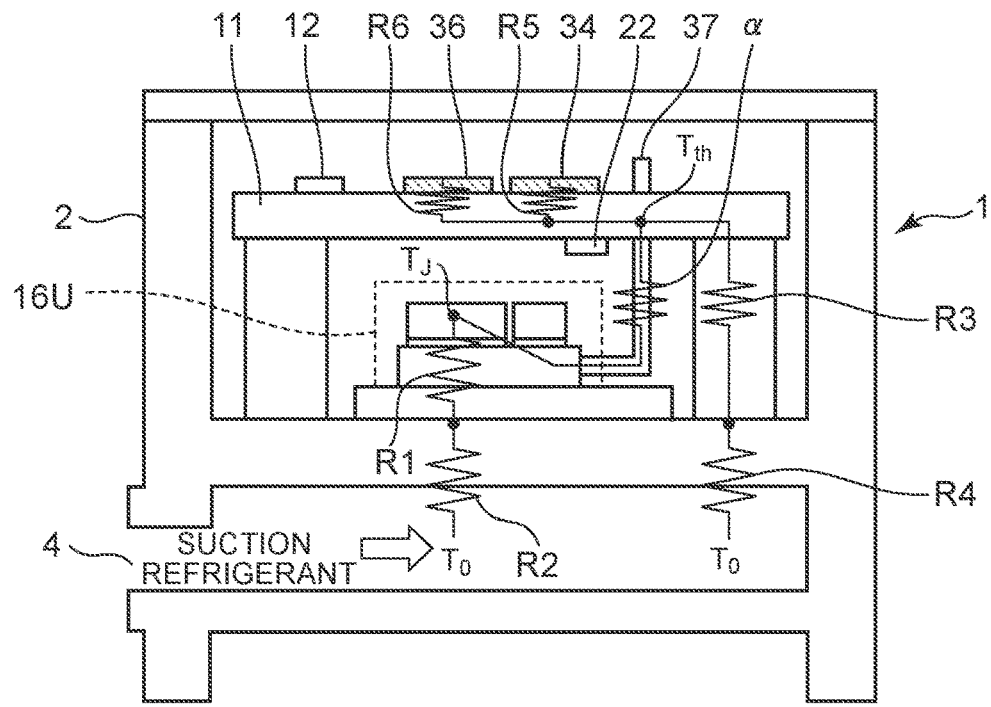
FIG. 10 is a fragmentary cross-sectional view of a vehicular electric compressor for describing the relationship between an input current and a thermal variable α.
Figure 11:
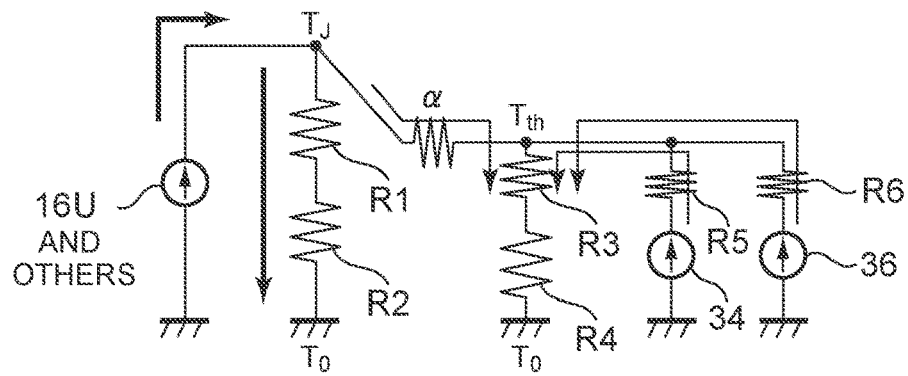
FIG. 11 is a thermal circuit diagram for describing the relationship between the input current and the thermal variable α.

Next, description will be made about another control example in which the thermal variable α of the above-mentioned equation (2) is changed by the junction temperature estimate calculating unit 32 of the inverter control unit 12 with reference to FIGS. 9 to 11. When the input current Iin flows through the wiring pattern 36, the wiring pattern 36 also generates heat. Since the generated heat is also transferred to the temperature sensor 22, the temperature Tth detected by the temperature sensor 22 rises under the influence of the heat.

Therefore, the junction temperature estimate calculating unit 32 of this embodiment changes the thermal variable α of the above-mentioned equation (2) according to the input current Iin (operating state) to correct the junction temperature Tj in the direction of excluding the influence of the heat generated by the wiring pattern 36 on the temperature sensor 22.

(10-1) Relationship Between Input Current Iin and Thermal Variable α

Next, description will be made about the relationship between the input current Iin and the thermal variable α with reference to FIGS. 10 and 11. Incidentally, in each figure, those shown by the same reference numerals as those in FIGS. 5 and 6 are assumed to have the same or similar functions. In the case of the embodiment, the relationship between the thermal variable α and the input current Iin is assumed to be a linear function shown in FIG. 9 and is stored in advance in the junction temperature estimate calculating unit 32. Incidentally, the function in FIG. 9 is a value obtained by an experiment in advance for the vehicular electric compressor 1.

Also, in this case as well, the transfer of heat is considered by replacing with an electric circuit. That is, the power semiconductor elements 16U to 0.1 W and the wiring patterns 34 and 36 which are thermal sources serve as current sources as shown in FIG. 11, and the thermal resistances of each element and the housing 2 become resistances R1 to R6. Further, similarly, the temperature variable α exists between the junction temperature Tj and the temperature Tth detected by the temperature sensor 22.

The larger the input current Tin, the larger the heat generated by the wiring pattern 36, and the temperature Tth detected by the temperature sensor 22 rises depending on the amount of heat generated. Therefore, the accurate junction temperature Tj excluding the thermal influence from the wiring pattern 36 can be estimated by making the thermal variable α smaller as the input current Iin is larger.

Embodiment 2

(11) Change of Thermal Variable α by Junction Temperature Estimate Calculating Unit 32 (Part 3)

Figure 13:
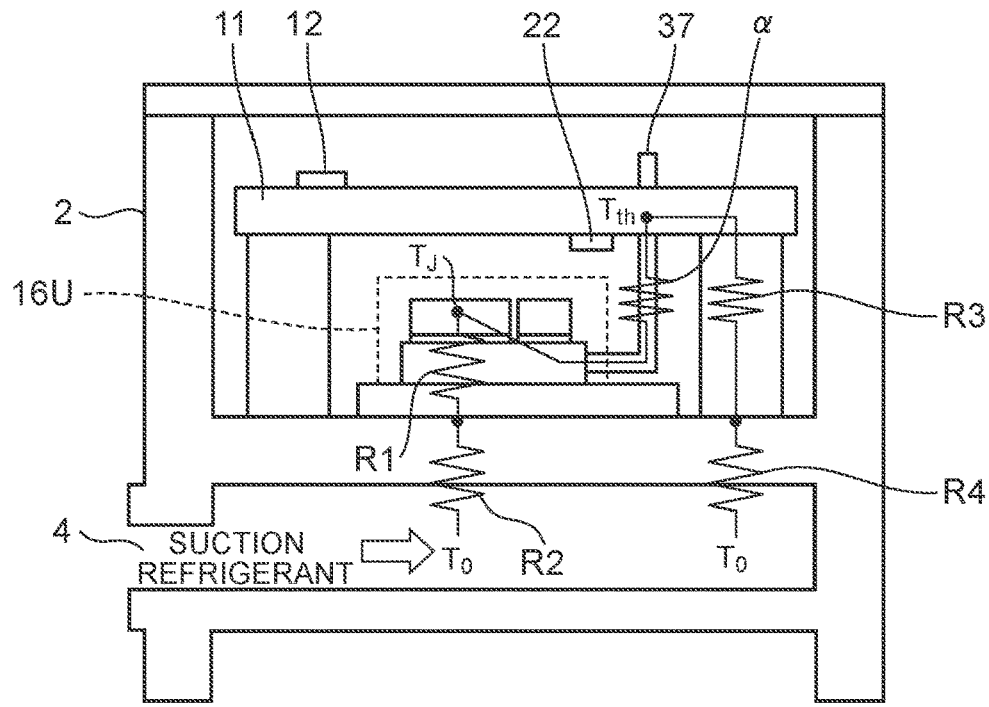
FIG. 13 is a fragmentary cross-sectional view of a vehicular electric compressor for describing the relationship between the number of revolutions of the motor and the thermal variable α.
Figure 14:
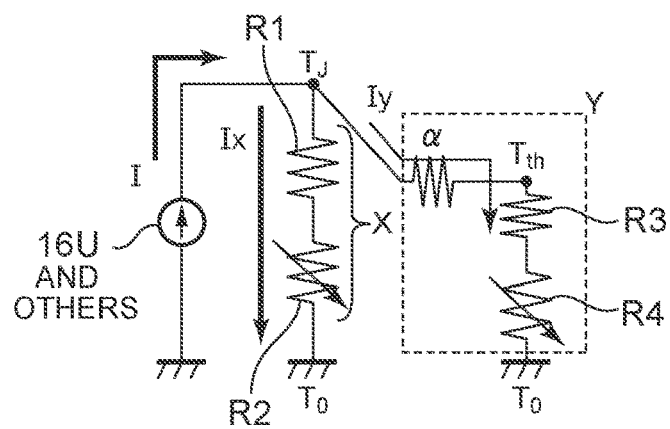
FIG. 14 is a thermal circuit diagram for describing the relationship between the number of revolutions of the motor and the thermal variable α.

Next, description will be made about a further control example in which the thermal variable α of the above-mentioned equation (2) is changed by the junction temperature estimate calculating unit 32 of the inverter control unit 12 with reference to FIGS. 12 to 14. As described above, the power semiconductor elements 16U to 17W are arranged in a heat exchange relationship with the suction refrigerant via the housing 2. Further, as the revolution speed NC of the motor 3 increases, the cooling capacity by the suction refrigerant also increases.

Therefore, as the revolution speed NC is higher, the power semiconductor elements 16U to 17W are cooled more strongly. Therefore, the junction temperature estimate calculating unit 32 decreases the thermal variable α as the revolution speed NC of the motor 3 increases as shown in FIG. 12 and performs a correction in the direction in which the junction temperature Tj becomes lower. The reason will be described with reference to FIGS. 13 and 14.

Figure 6:
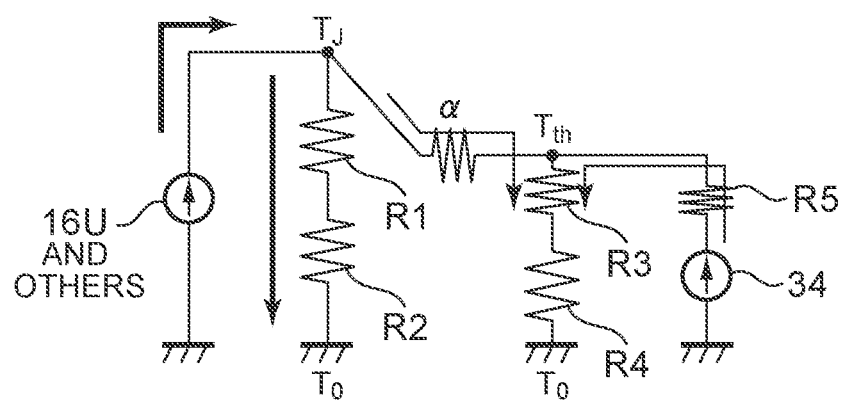
FIG. 6 is a thermal circuit diagram for describing the relationship between the phase current and the thermal variable α.

Incidentally, in each figure, those shown by the same reference numerals as those in FIGS. 5 and 6 are assumed to have the same or similar functions. Further, also in this embodiment, it is assumed that a device to be applied is the electric compressor 1 of FIG. 1, and an electric circuit configuration of an inverter device 7 is also the same as that of FIG. 2. However, the operation of the junction temperature estimate calculating unit 32 of the inverter control unit 12 in FIG. 2 is different from that in the above embodiment.

In this case as well, if the power semiconductor elements 16U to 17W are regarded as a heat source and the transfer of its heat (considered as a current I) is considered by replacing with an electric circuit, a current (heat) Iz flowing through a resistance group X consisting of resistances R1 and R2 and a current Iy (heat) flowing through a resistance group Y consisting of a thermal variable α and resistances R3 and R4 can be expressed by the following equations (5) and (6), respectively, according to the law of shunting.

$$Ix=\{Y/(X+Y)\} \times I \quad (5)$$

$$Iy=\{X/(X+Y)\} \times I \quad (6)$$

Here, since the resistance group Y includes the thermal resistance of the resin-made control board 11, it becomes a value much larger than that of the resistance group X. Therefore, even if the resistance values of resistances R2 and R4 which fluctuate with the fluctuation of the revolution speed NC of the motor 3 fluctuate, the current Iy is hardly affected as is obvious from the equations (5) and (6). That is, the temperature Tth detected by the temperature sensor 22 is not so affected by the revolution speed NC of the motor 3.

On the other hand, as the revolution speed NC of the motor 3 increases, the fluctuating resistance values of the resistance R2 and R4 become smaller. Therefore, the junction temperature Tj decreases, but as described above, the temperature Tth detected by the temperature sensor 22 is not lowered as in the junction temperature Tj, and the difference between the two (Tj and Tth) is getting smaller.

Figure 12:
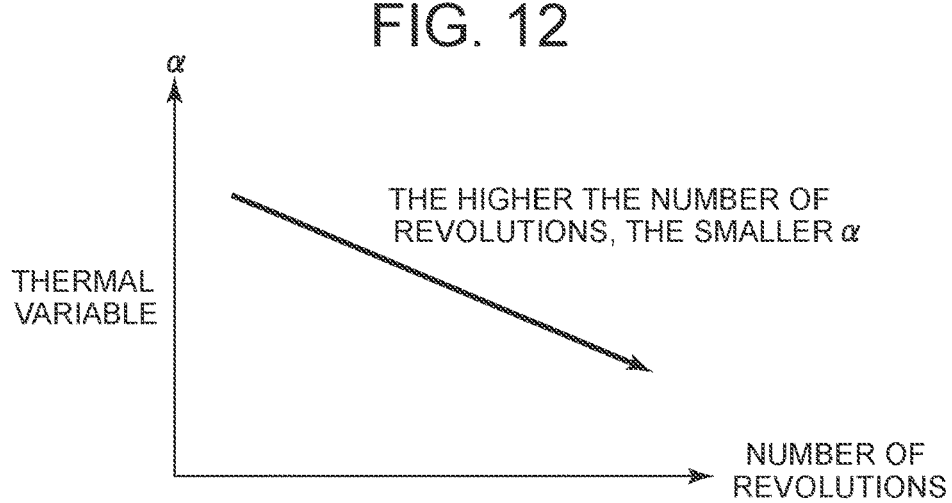
FIG. 12 is a graph describing the relationship between the number of revolutions of a motor and a thermal variable α (embodiment 2)

Therefore, in this embodiment, the junction temperature estimate calculating unit 32 reduces the thermal variable α as the revolution speed NC of the motor 3 increases as shown in FIG. 12 and performs a correction in the direction in which the junction temperature Tj decreases. Thus, even in this case, the accurate junction temperature Tj can be estimated. Then, also in this case, the temperature protection unit 33 executes the same protection operation as described above based on the estimated junction temperature Tj.

As described in detail, above, in the above-described embodiment 1, when the junction temperature estimate calculating unit 32 estimates the junction temperature Tj, it performs the correction in the direction of excluding the influence of the heat generated by other electronic components other than the power semiconductor elements 16U to 17W and the wiring patterns 34 and 36 of the control board 11 on the temperature sensor 22. Therefore, in the cases such as when the temperature sensor 22 is arranged on the control board 11 as in the embodiment, it is possible to eliminate the influence of the heat generated by other electronic components other than the power semiconductor elements 16U to 17W and the wiring patterns 34 and 36 on the temperature sensor 22 and more accurately estimate the junction temperature Tj of each of the power semiconductor elements 16 to 17W.

Thus, even when the protection operation as described above is executed, the usable area of the power semiconductor elements 16U to 17W can be expanded, thereby making it possible to reduce the rating of each component and achieve miniaturization and low cost.

Further, as in the embodiment, the junction temperature estimate calculating unit 32 calculates the temperature rise value ΔT by multiplying the loss P of the power semiconductor elements 16U to 17W by the thermal variable α, and changes the thermal variable α, based on the operating state. Therefore, it is possible to smoothly exclude the influence of the heat generated by other electronic components and the wiring patterns 34 and 36 of the control board 11 on the temperature sensor 22.

In this case, in the embodiment, the battery voltage Vb (power supply voltage), the phase current (Iu, Iv, Iw), and the input current Iin are adopted as the operating states. Further, in the above embodiment, since the thermal variable α is mapped as a value determined from the battery voltage Vrb and the phase current, it is possible to accurately set the thermal variable α according to each operating state related to each other.

In this case, in the embodiment, the higher the battery voltage Vb, the larger the thermal variable α, so that the accurate junction temperature Tj can be estimated. Further, since the thermal variable α is made smaller as the phase current Iu, Iv, Iw increases, the accurate junction temperature Tj can be estimated in the same manner. Further, as the input current Iin is larger, the thermal variable α is made smaller. Therefore, this also allows the accurate junction temperature TJ to be estimated.

Then, in the vehicular electric compressor 1 as in the embodiment used under a high temperature environment, it is possible to realize extremely effective superheat protection by operating the motor 3 by the inverter device 1 of the embodiment.

Meanwhile, in the invention of the embodiment 2, the junction temperature Tj is corrected in the direction of lowering it as the revolution speed NC of the motor 3 increases. This also allows the accurate junction temperature Tj to be estimated. Also in the case of this embodiment, the junction temperature estimate calculating unit 32 calculates the temperature rise value ΔT by multiplying the loss P of the power semiconductor elements 16U to 17W by the thermal variable α, and changes the thermal variable α so that the higher the number of revolutions NC of the motor 3, the smaller the thermal variable α. Therefore, it is possible to smoothly estimate the accurate junction temperature Tj.

Thus, even when the above-mentioned protection operation is executed, the usable area of the power semiconductor elements 16U to 17W can be expanded in the same manner, thereby making it possible to reduce the rating of each component and achieve miniaturization and low cost.

Embodiment 31

(12) Change Control of Gate Resistance

Next, description will be made about the control of changing the gate resistance of each semiconductor switching element 18 by the inverter control unit 12 with reference to FIGS. 17 to 19. The inverter control unit 12 of this embodiment changes the gate resistance of the semiconductor switching element 18 constituting each power semiconductor element 16U to 17W, based on the junction temperature Tj estimated by the Junction temperature estimate calculating unit 32 as described above.

Figure 15:
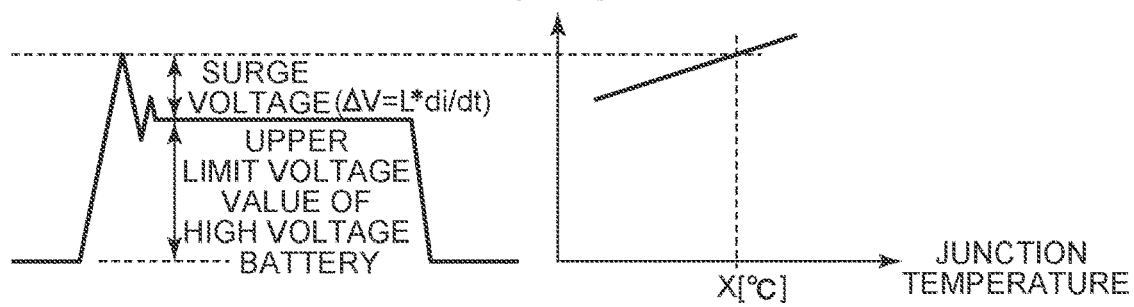
FIG. 15 is a diagram showing the relationship between a collector-emitter voltage (including a surge voltage) at the time of turn-off of a semiconductor switching element (IGBT) of a power semiconductor element in an embodiment, a junction temperature of the semiconductor switching element, and an element withstand voltage.

When the gate of the semiconductor switching element 18 (IGBT) is driven as described above, the surge voltage ΔV (=L*di/dt) is generated by the inductance L of the wiring bus bar when the gate is turned from ON to OFF (turn off) (left side of FIG. 15). On the other hand, the withstand voltage of the semiconductor switching element 18 (IGBT) has a characteristic that it decreases as the junction temperature Tj decreases (right side of FIG. 15). Then, when the surge voltage ΔV exceeds the withstand voltage of the semiconductor switching element 18 (element withstand voltage), there is a risk that the element will be destroyed.

Figure 16:
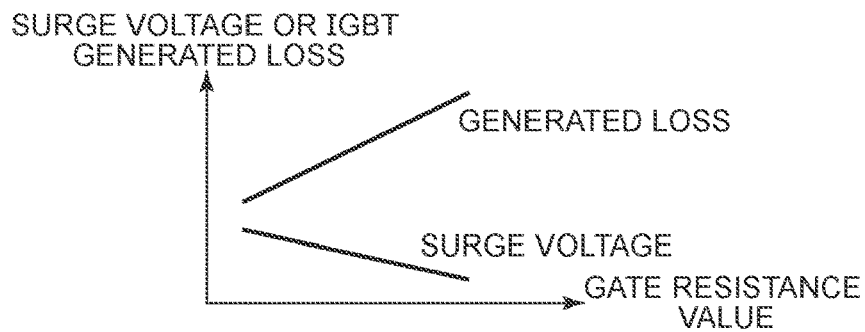
FIG. 16 is a diagram showing the relationship between a resistance value (gate resistance value) of a gate resistance of the semiconductor switching element (IGBT) of the power semiconductor element in the embodiment, a surge voltage, and a generated loss.

Therefore, it is necessary to connect the gate resistance denoted at 39 in FIG. 2 to the gate of the semiconductor switching element 18 to dull the falling of the signal voltage given to the gate by the gate resistance 39. However, when the resistance value of the gate resistance 39 is increased, the current cutoff speed when the semiconductor switching element 18 is turned OFF becomes slower, and the generated loss increases (FIG. 16). On the other hand, it is known that when the semiconductor switching element 18 operates, heat is generated by itself due to the generated loss, so that the junction temperature Tj gradually increases and the withstand voltage (element withstand voltage) also increases accordingly.

Therefore, the inverter control unit 12 of this embodiment determines the resistance value of the gate resistance of the semiconductor switching element 18 of each power semiconductor element 16U to 17W, based on the junction temperature Tj estimated by the junction temperature estimate calculating unit 32 as described above. Hereinafter, the control of changing the gate resistance by the inverter control unit 12 will be specifically described.

In this embodiment, the inverter control unit 12 has a gate resistance changing unit 41. FIG. 17 is an electric circuit diagram showing an example of the configuration of the gate resistance changing unit 41 of the inverter control unit 12 of this embodiment. Incidentally, in FIGS. 17 to 19, those shown by the same reference numerals as those in FIGS. 1 to 14 have the same or similar functions, and a basic electric circuit is also the same as in FIG. 2. However, in this embodiment, the gate resistance 39 described above is replaced with a variable resistance device 42 shown in FIG. 17.

Figure 17:
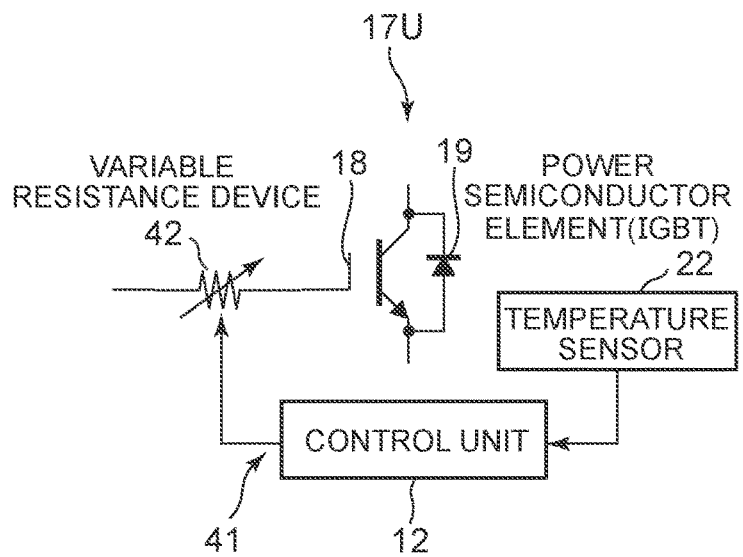
FIG. 17 is an electric circuit diagram showing an example of the configuration of a gate resistance changing unit of the inverter device of the present invention (embodiment 3)

Here, although FIG. 17 shows the semiconductor switching element 18 of the power semiconductor element 17U as a representative, it is assumed that the same variable resistance device 42 is connected to each gate even for the semiconductor switching elements 18 of all the power Semiconductor elements 16U to 17W and controlled by the inverter control unit 12.

Then, the variable resistance device 42, the gate driver 29 described above, and the PWM control unit 27 constitute the gate resistance changing unit 41 in this embodiment. Incidentally, regarding the internal configurations and control programs of the gate driver 29 and the PWM control unit 27, the configuration and control program necessary for realizing this embodiment are added to those of each of the above-described embodiments, or changes are made thereto.

The gate resistance changing unit 41 of this embodiment changes the resistance value of the variable resistance device 42 being the resistance value of the gate resistance of the semiconductor switching element 18, based on the junction temperature Tj of the semiconductor switching element 18 of each of the power semiconductor elements 16U to 17W, which is estimated by the junction temperature estimate calculating unit 32. In this case, the gate resistance changing unit 41 operates in the direction of increasing the resistance value of the variable resistance device 42 as the j unction temperature Tj becomes lower and decreasing the resistance value of the variable resistance device 42 as the junction temperature Tj becomes higher.

Figure 18:
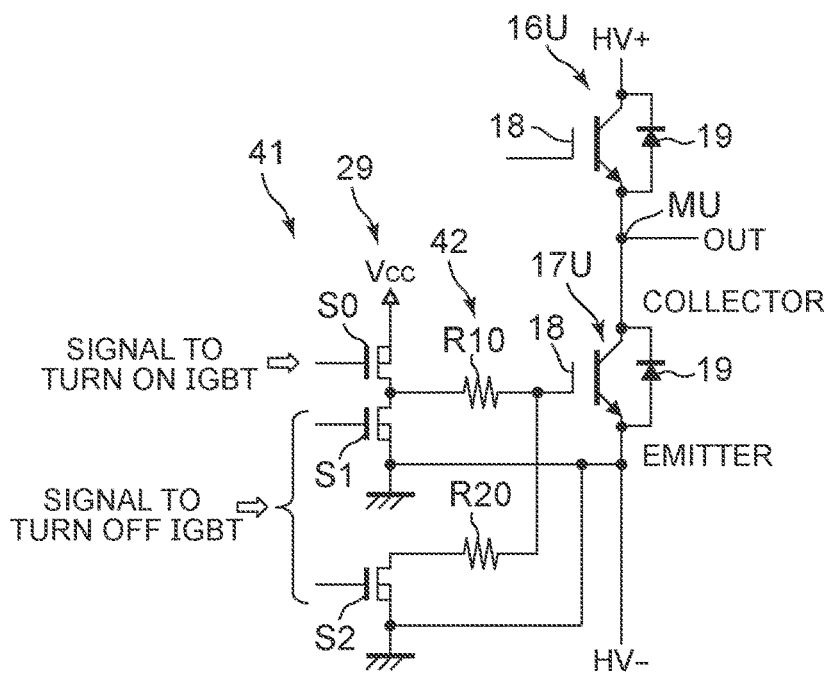
FIG. 18 is a diagram showing an example of a specific electric circuit of the gate resistance changing unit of FIG. 17.
Figure 19:
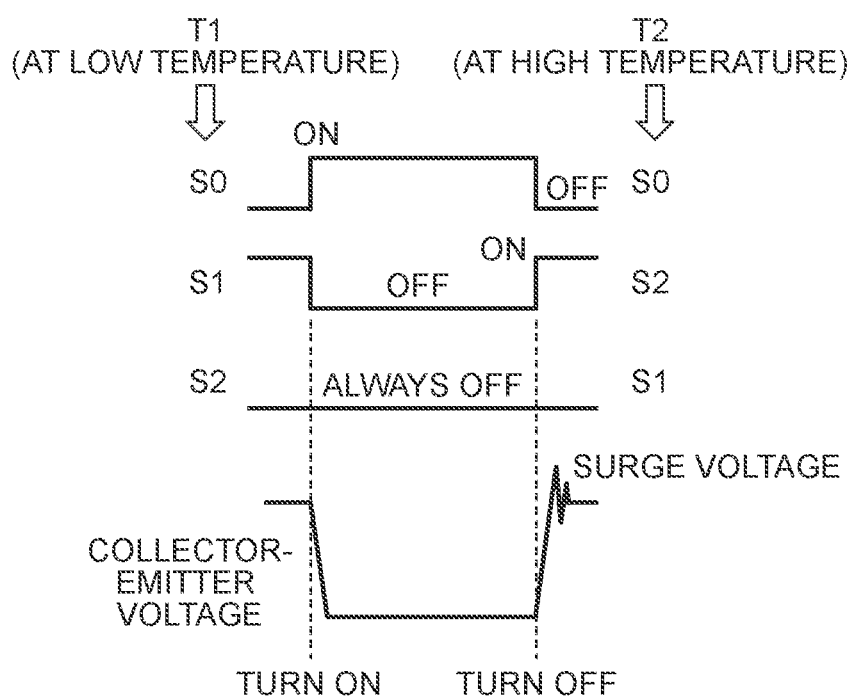
FIG. 19 is a diagram for describing the operation of the gate resistance changing unit in FIG. 18.

FIG. 18 shows an example of a specific electric circuit around the gate resistance changing unit 41 including the variable resistance device 42 described above. The gate resistance changing unit 41 of this example is constituted of an ON signal generating switch S0 comprised of a MOSFET whose source is connected to a gate voltage power supply Vcc of the semiconductor switching element 18, an OFF signal generating switch S1 also comprised of a MOSFET whose source is grounded and drain is connected to a drain of the ON signal generating switch S0, a resistance element R10 connected between a connection point between the drain of the ON signal generating switch S0 and the drain of the OFF signal generating switch 31 and the gate of the semiconductor switching element 18, and another resistance element P20 whose one end is connected between the resistance element R10 and the gate of the semiconductor switching element 18 and whose other end is connected to a drain of another OFF signal generating switch S2 also comprised of a MOSFET.

A source of the OFF signal generating switch S2 is grounded, and an emitter of the semiconductor switching element 18 of the power semiconductor element 17U is also connected to the sources of the OFF signal generating switches S1 and 32 and grounded. Thus, the ON signal generating switch S0 and the OFF signal generating switch S1 are connected to the gate of the semiconductor switching element 18 via the resistance element R10, and the OFF signal generating switch 32 is connected to the gate of the semiconductor switching element 18 via the resistance element R20. Incidentally, the above configuration also applies to the semiconductor switching elements 18 of the power semiconductor elements 17V and 17W. The same applies to the semiconductor switching elements 18 of the power semiconductor elements 16U to 16W, but the emitter is assumed not to be grounded.

In this case, the ON signal generating switch S0 and the OFF signal generating switches S1 and 32 are included in the gate driver 29. Further, the resistance elements R10 and R20 constitute the variable resistance device 42 of the embodiment, and these resistance elements R10 and R20 are provided in the immediate vicinity of the gate of the semiconductor switching element 18. Further, the resistance element R10 and the resistance element R20 are different in resistance value, and the resistance value of the resistance element R10 is assumed to be larger than the resistance value of the resistance element R20.

Then, a signal to turn ON the semiconductor switching element 18 (IGBT) described above is input from the PWM control unit 27 to the gate of the ON signal generating switch S0. A signal to turn OFF the semiconductor switching element 18 (IGBT) is input to the OFF signal generating switches S1 and S2. In this case, the PWM control unit 27 switches and outputs the signal to turn OFF the semiconductor switching element 18 to each of the OFF signal generating switches S1 and S2, based on the junction temperature Tj estimated by the junction temperature estimate calculating unit 32. Consequently, when the OFF signal generating switches S1 and S2 are switched to ON, and the semiconductor switching element 18 is turned OFF, the resistance value of the gate resistance of the semiconductor switching element 18 is changed.

Next, the operation of the gate resistance changing unit 41 of FIG. 18 will be described with reference to FIG. 19. The lowermost stage of FIG. 19 shows the collector-emitter voltage of the semiconductor switching element 18. The uppermost stage shows an ON/OFF state of the ON signal generating switch S0, and the second and third stages from the top show an ON/OF state of the E OFF signal generating switches S1 and S2.

When the semiconductor switching element 18 of each of the power semiconductor elements 16U to 17W is turned ON (turn on), the gate driver 29 outputs the signal to turn ON the semiconductor switching element 18 to the ON signal generating switch S0 to turn ON the ON signal generating switch S0, in response to the rising of the drive signal output from the PWM control unit 27. On the other hand, the signal to turn OFF the semiconductor switching element 18 is not output, so that the OFF signal generating switches S1 and S2 are OFF (during a period in which the ON signal generating switch S0 in FIG. 19 is ON, the OFF signal generating switches S1 and S2 are OFF). Thus, a current flows through the gate of the semiconductor switching element 18 along a path of the gate voltage power supply Vcc, the ON signal generating switch S0, the resistance element R10, the gate and emitter of the semiconductor switching element 18, and the ground, and hence the semiconductor switching element 18 is turned ON (turn on).

Next, when the semiconductor switching element 18 is turned OFF (turn off), the gate driver 29 (which constitutes the gate resistance changing unit 41 as described above) outputs the signal to turn OFF the semiconductor switching element 18 to the OFF signal generating switch S1 (or S2) to turn ON the OFF signal generating switch S1 (or S2), in response to the falling of the drive signal output from the PWM control unit 27. On the other hand, the signal to turn ON the semiconductor switching element 18 is not output, so that the ON signal generating switch S0 is OFF (during a period in which S1 (or S2) in FIG. 19 is ON, the ON signal generating switch S0 is OFF). The gate driver 29 (gate resistance changing unit 41) switches an output partner for the signal to turn OFF the semiconductor switching element 18 according to the unction temperature Tj estimated by the junction temperature estimate calculating unit 32.

In the embodiment, when the junction temperature Tj is low (at low temperature) and is equal to or less than a predetermined value T1, in response to the falling of the drive signal output from the PWM control unit 27, the gate driver 29 outputs the signal to turn OFF the semiconductor switching element 18 to the OFF signal generating switch S1 to turn ON the OFF signal generating switch S1 and turn OFF the OFF signal generating switch 32. Consequently, since the electric charge accumulated in the gate of the semiconductor switching element 18 is discharged through a path of the resistance element R10, the OFF signal generating switch S2, and the ground, the semiconductor switching element 18 is turned OFF. Therefore, at such a low temperature, the resistance value of the gate resistance of the semiconductor switching element 18 becomes the resistance value of the resistance element R10 large in resistance value, so that the surge voltage is suppressed.

On the other hand, when turning OFF the semiconductor switching element 18 where the junction temperature Tj rises to reach a predetermined value T2 or more higher than the predetermined value T1 described above, in response to the falling of the drive signal output from the PWM control unit 27, the gate driver 29 outputs the signal to turn OFF the semiconductor switching element 18 to the OFF signal generating switch S2 to turn ON the OFF signal generating switch S2 and turn OFF the OFF signal generating switch 31. As a result, the electric charge accumulated in the gate of the semiconductor switching element 18 is discharged through a path of the resistance element R20, the OFF signal generating switch 32, and the ground. Therefore, when the semiconductor switching element 18 is turned OFF, the resistance value of the gate resistance of the semiconductor switching element 18 becomes the resistance value of the resistance element R20 small in resistance value at a high temperature. Therefore, although the surge voltage increases, the withstand voltage of the semiconductor switching element 18 also rises at such a high temperature, so that element destruction does not occur. Then, the generated loss can be suppressed.

Incidentally, after that, when turning OFF the semiconductor switching element 13 where the junction temperature Tj drops and becomes the predetermined value T1 or less, in response to the falling of the drive signal output from the PWM control unit 27, the gate driver 29 outputs the signal to turn OFF the semiconductor switching element 18 to the OFF signal generating switch S1 to turn ON the OFF signal generating switch S1 and switch the OFF signal generating switch 32 to turn OFF.

As in each of the above-described embodiments, the junction temperature Tj of the semiconductor switching element 18 of each of the power semiconductor elements 16U to 17W can be accurately estimated, so that it has become possible to accurately grasp the fluctuation of the withstand voltage of the semiconductor switching element 18 of each of the power semiconductor elements 16U to 17W.

Then, in this embodiment, as described in detail above, the inverter control unit 12 is provided with the gate resistance changing unit 41 which changes the resistance value of the gate resistance of the semiconductor switching element 18 of each of the power semiconductor elements 16U to 17W. The resistance value of the gate resistance of the semiconductor switching element 18 is changed by the gate resistance changing unit 41, based on the junction temperature Tj of the semiconductor switching element 18 estimated by the junction temperature estimate calculating unit 32. Therefore, it has become possible to realize the optimum operation considering the withstand voltage of the semiconductor switching element 18.

Then, in the embodiment, the gate resistance changing unit 41 increases the resistance value of the gate resistance of the semiconductor switching element 18 as the junction temperature Tj of the semiconductor switching element 18 estimated by the junction temperature estimate calculating unit 32 becomes lower, and decreases the resistance value of the gate resistance of the semiconductor switching element 18 as the junction temperature Tj becomes higher. Therefore, in a situation where the junction temperature Tj is low and the withstand voltage of the semiconductor switching element 18 decreases, the resistance value of the gate resistance can be increased to reduce the surge voltage. In a situation where the junction temperature Tj is high and the withstand voltage of the semiconductor switching element 18 rises, the resistance value of the gate resistance can be decreased to reduce the generated loss.

Thus, it is possible to suppress the generated loss and realize the efficient operation while avoiding the destruction of the power semiconductor elements 16U to 17W due to the surge voltage.

In this case, in the embodiment, the gate resistance changing unit 41 is provided with the variable resistance device 42 connected to the gate of the semiconductor switching element 18. Based on the junction temperature Tj estimated by the junction temperature estimate calculating unit 32, the resistance value of the variable resistance device 42 is changed, and the lower the junction temperature Tj the larger the resistance value of the variable resistance device 42, and the higher the junction temperature Tj, the smaller the resistance value of the variable resistance device 42. Therefore, it is possible to realize both prevention of destruction of the power semiconductor elements 16U to 17W due to the surge voltage and suppression of the generated loss of the power semiconductor elements 16U to 17W.

In particular, in the embodiment, the variable resistance device 42 is provided with the ON signal generating switch S0 connected to the gate of the semiconductor switching element 18 and for inputting the ON signal to the gate, the two OFF signal generating switches S1 and S2 each connected to the gate and for inputting the OFF signal to the gate, and the two resistance elements R10 and R20 different in resistance value, which are respectively connected to these OFF signal generating switches S1 and S2. When the semiconductor switching element 18 is turned OFF, the gate resistance changing unit 41 switches and turns ON each of the OFF signal generating switches S1 and S2, based on the junction temperature Tj, thereby to change the resistance value of the gate resistance of the semiconductor switching element 18. Also, when the junction temperature Tj is equal to or less than the predetermined value T1, the gate resistance changing unit 41 turns ON the OFF signal generating switch S1 to which the resistance element R10 large in resistance value is connected, and turns ON the OFF signal generating switch S2 to which the resistance element R20 small in resistance value is connected, when the junction temperature Tj is greater than or equal to the predetermined value T2 higher than the predetermined value T1. Therefore, it is possible to realize both prevention of destruction of the power semiconductor elements 16U to 17W due to the surge voltage when the semiconductor switching element 18 is turned OFF, and suppression of the generated loss of the power semiconductor elements 16U to 17W.

Incidentally, in the above-described embodiment, the 3-dimensional map of the thermal variable α is configured by the battery voltage Vb (power supply voltage) and the phase current, but is not limited thereto. The 3-dimensional map may be configured by, for example, the battery voltage Vb and the input current Iin.

Further, the embodiment has been described by taking for example the power semiconductor elements 16U to 17W each comprised of the composite of the semiconductor switching element 18 (IGBT, MOSFET) and the flywheel diode 19, but is not limited to this. The present invention is also effective for an inverter circuit comprised of only semiconductor switching elements (IGBT, MOSFET) having no flywheel diodes.

Further, in the embodiment, the present invention has been described by the inverter device which drives the motor of the electric compressor mounted on the vehicle, but the inventions of claims 2 to 9 are not limited to this. The present invention is effective for general inverter devices each using an inverter circuit having power semiconductor elements.

Furthermore, it goes without saying that the electric circuit of the gate resistance changing unit 41 shown in the above embodiment is not limited to that of the embodiment and can be changed within the scope not departing from the spirit of the present invention. In particular, in the embodiment, the variable resistance device 42 is constituted of the two OFF signal generating switches and the two resistance elements, but by using more switches and resistance elements and switching the switches based on the junction temperature Tj, the gate resistance of the semiconductor switching element 18 of each of the power semiconductor elements 16U to 17W may be changed more finely.

DESCRIPTION OF REFERENCE NUMERALS 1 electric compressor
2 housing
3 motor
4 suction port
6 compression element
7 inverter device
8 inverter circuit
11 control board
12 inverter control unit
16U-17W power semiconductor element
13 semiconductor switching element
22 temperature sensor (temperature detector)
23 shunt resistance (phase current detector)
26 motor control unit
27 PWM control unit
28 current detecting unit
29 gate driver
31 loss calculating unit
32 junction temperature estimate calculating unit
33 temperature protection unit
41 gate resistance changing unit
42 variable resistance device
B high voltage battery
R10, R20 resistance element
S0 ON signal generating switch
S1, S2 OFF signal generating switch

The invention claimed is:

1. An inverter device including an inverter circuit having at least one power semiconductor element, and an inverter control unit to drive the at least one power semiconductor element, comprising:
a temperature detector to detect a temperature in the vicinity of a power semiconductor element of the at least one semiconductor element,
wherein the inverter control unit includes:
a loss calculating unit to calculate a loss P of the power semiconductor element, and
a junction temperature estimate calculating unit to add a temperature rise value ΔT obtained from the loss P of the power semiconductor element calculated by the loss calculating unit to the temperature Tth detected by the temperature detector to estimate a junction temperature Tj of the power semiconductor element,
wherein when estimating the junction temperature Tj, the junction temperature estimate calculating unit performs a correction in a direction of excluding an influence of heat generation of other electronic components other than the power semiconductor element and/or a wiring pattern of a control board on the temperature detector, and
wherein the junction temperature estimate calculating unit multiplies the loss P of the power semiconductor element by a predetermined thermal variable α to calculate the temperature rise value ΔT, and
changes the thermal variable α, based on an operating state to perform the correction in the direction of excluding the influence of heat generation of the other electronic components and/or the wiring pattern of the control board on the temperature detector.

2. The inverter device according to claim 1, wherein the temperature detector is arranged on the control board on which the other electronic components are mounted.

3. The inverter device according to claim 1, wherein the operating state includes any one or more of a power supply voltage, a phase current, and an input current.

4. The inverter device according to claim 3, wherein the thermal variable α is mapped as a value determined from at least two of the power supply voltage, the phase current, and the input current.

5. The inverter device according to claim 3, wherein the thermal variable α becomes larger as the power supply voltage becomes higher.

6. The inverter device according to claim 3, wherein the thermal variable α becomes smaller as the phase current increases.

7. The inverter device according to claim 3, wherein the thermal variable α becomes smaller as the input current increases.

8. The inverter device according to claim 1, wherein when the junction temperature Tj of the power semiconductor element estimated by the junction temperature estimate calculating unit exceeds a predetermined value, the inverter control unit executes a predetermined protection operation.

9. A vehicular electric compressor comprising:
a motor operated by the inverter device according to claim 1; and
a housing in which the motor is accommodated,
wherein the power semiconductor element is arranged in a heat exchange relationship with a low temperature portion of the housing.

10. A vehicular electric compressor comprising:
an inverter device including an inverter circuit having at least one power semiconductor element, and an inverter control unit to drive the at least one power semiconductor element;
a motor operated by the inverter device; and
a housing in which the motor is accommodated,
wherein the at least one power semiconductor element is arranged in a heat exchange relationship with a suction refrigerant via the housing,
wherein the vehicular electric compressor includes a temperature detector to detect a temperature in the vicinity of the at least one power semiconductor element,
wherein the inverter control unit includes:
a loss calculating unit to calculate a loss P of the at least one power semiconductor element, and
a junction temperature estimate calculating unit to adds a temperature rise value ΔT obtained from the loss P of the at least one power semiconductor element calculated by the loss calculating unit to the temperature Tth detected by the temperature detector to estimate a junction temperature Tj of the at least one power semiconductor element,
wherein when estimating the junction temperature Tj, the junction temperature estimate calculating unit corrects the junction temperature Tj in a direction of being lowered as a number of revolutions of the motor becomes higher, and
wherein the junction temperature estimate calculating unit multiplies the loss P of the at least one power semiconductor element by a predetermined thermal variable α to calculate the temperature rise value ΔT and changes the thermal variable α so that the thermal variable α becomes smaller as the number of revolutions of the motor becomes higher.

11. The vehicular electric compressor according to claim 10, wherein when the junction temperature Tj of the at least one power semiconductor element estimated by the junction temperature estimate calculating unit exceeds a predetermined value, the inverter control unit executes a predetermined protection operation.

12. An inverter device including an inverter circuit having at least one power semiconductor element, and an inverter control unit to drive the at least one power semiconductor element, comprising:
a temperature detector to detect a temperature in the vicinity of a power semiconductor element of the at least one power semiconductor element,
wherein the inverter control unit includes:
a loss calculating unit to calculate a loss P of the power semiconductor element, and
a junction temperature estimate calculating unit to add a temperature rise value ΔT obtained from the loss P of the power semiconductor element calculated by the loss calculating unit to the temperature Tth detected by the temperature detector to estimate a junction temperature Tj of the power semiconductor element,
wherein when estimating the junction temperature Tj, the junction temperature estimate calculating unit performs a correction in a direction of excluding an influence of heat generation of other electronic components other than the power semiconductor element and/or a wiring pattern of a control board on the temperature detector,
wherein the inverter control unit has a gate resistance changing unit to change a resistance value of a gate resistance of the power semiconductor element, and
wherein the gate resistance changing unit changes the resistance value of the gate resistance of the power semiconductor element, based on the junction temperature Tj of the power semiconductor element estimated by the junction temperature estimate calculating unit.

13. The inverter device according to claim 12, wherein the gate resistance changing unit increases the resistance value of the gate resistance of the power semiconductor element as the junction temperature Tj of the power semiconductor element estimated by the junction temperature estimate calculating unit becomes lower, and decreases the resistance value of the gate resistance of the power semiconductor element as the junction temperature Tj of the power semiconductor element estimated by the junction temperature estimate calculating unit becomes higher.

14. The inverter device according to claim 12, wherein the gate resistance changing unit has a variable resistance device connected to a gate of the power semiconductor element, and wherein the gate resistance changing unit changes a resistance value of the variable resistance device, based on the junction temperature Tj of the power semiconductor element estimated by the junction temperature estimate calculating unit.

15. The inverter device according to claim 14, wherein the gate resistance changing unit increases the resistance value of the variable resistance device as the junction temperature Tj of the power semiconductor element estimated by the junction temperature estimate calculating unit becomes lower, and decreases the resistance value of the variable resistance device as the junction temperature Tj of the power semiconductor element estimated by the junction temperature estimate calculating unit becomes higher.

16. The inverter device according to claim 14, wherein the variable resistance device includes:
an ON signal generating switch connected to a gate of the power semiconductor element and for inputting an ON signal to the gate of the power semiconductor element,
a plurality of OFF signal generating switches each connected to the gate of the power semiconductor element and for inputting an OFF signal to the gate of the power semiconductor element, and
a plurality of resistance elements different in resistance value, which are respectively connected to the plurality of OFF signal generating switches, and
wherein when the power semiconductor element is turned OFF, the gate resistance changing unit turns ON each of the plurality of OFF signal generating switches, based on the junction temperature Tj of the power semiconductor element estimated by the junction temperature estimate calculating unit to change the resistance value of the gate resistance of the power semiconductor element.

17. The inverter device according to claim 16, wherein when the junction temperature Tj of the power semiconductor element estimated by the junction temperature estimate calculating unit is less than or equal to a predetermined value T1, the gate resistance changing unit turns ON an OFF signal generating switch of the plurality of OFF signal generating switches to which a resistance element of the plurality of resistance elements larger in resistance value is connected, and wherein when the junction temperature Tj of the power semiconductor element estimated by the junction temperature estimate calculating unit is greater than or equal to a second predetermined value T2 higher than the predetermined value T1, the gate resistance changing unit turns ON a second OFF signal generating switch of the plurality of OFF signal generating switches to which a second resistance element of the plurality of resistance elements smaller in resistance value is connected.

* * * * *